Jan. 13, 1970     R. A. ENGELHARDT     3,489,915
COMBINED SOLAR ARRAY BATTERY CHARGER
Filed Oct. 23, 1965     9 Sheets-Sheet 1
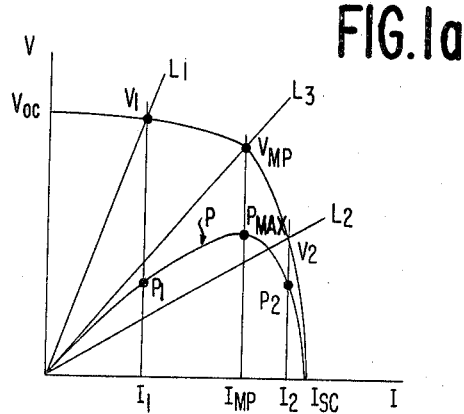
FIG.1a
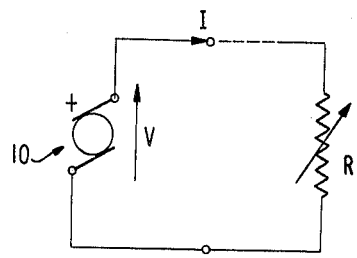
FIG.1b
FIG.2
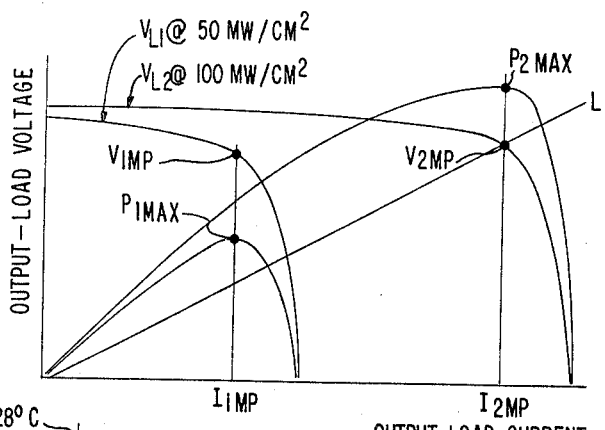
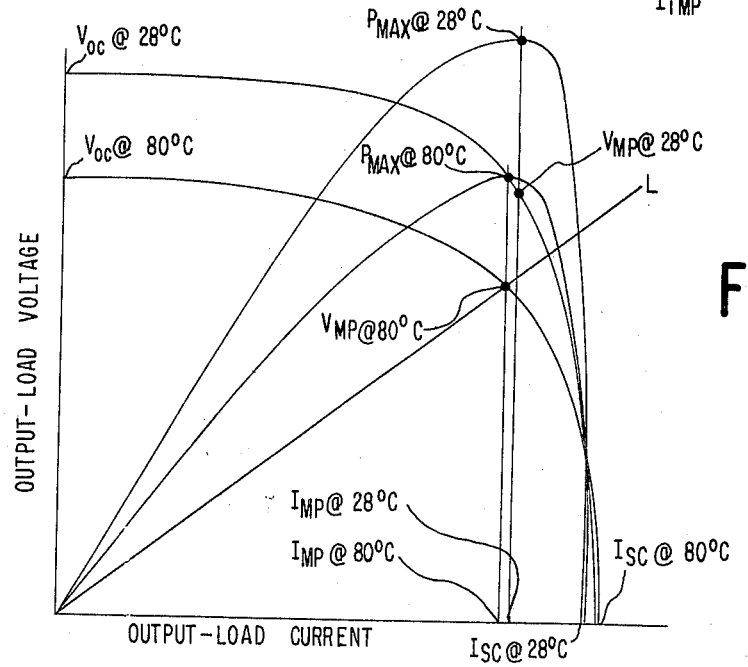
FIG.3
INVENTOR
RICHARD A. ENGELHARDT
BY *Hughes, Rothwell, Mion, Zinn & Macpeak*
ATTORNEYS Jan. 13, 1970 R. A. ENGELHARDT 3,489,915
COMBINED SOLAR ARRAY BATTERY CHARGER
Filed Oct. 23, 1965 9 Sheets-Sheet 2

INVENTOR
RICHARD A. ENGELHARDT

BY *Sughrue, Rothwell, Mion, Zinn & Macpeak*

ATTORNEYS

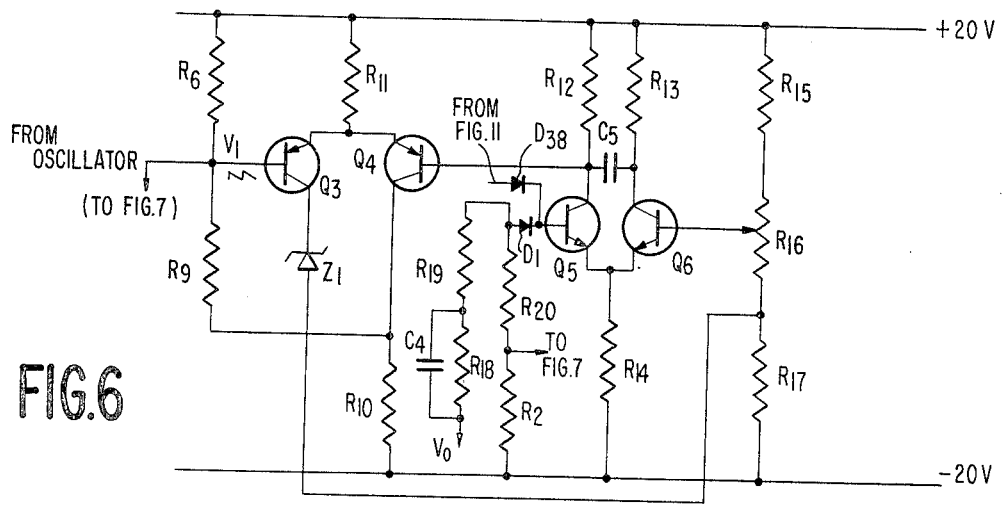
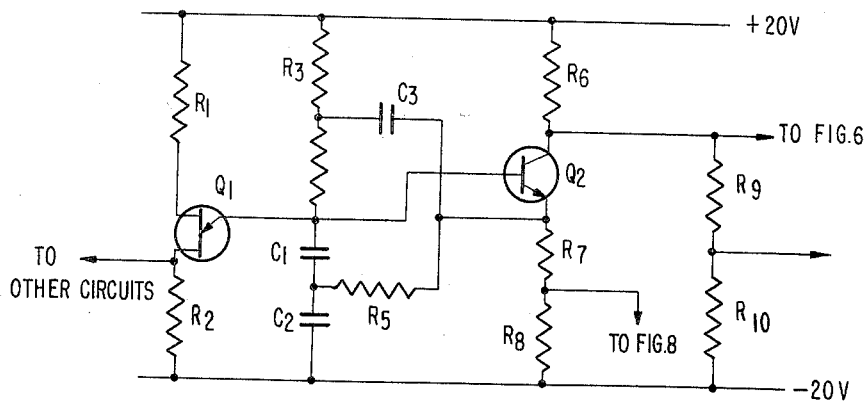

INVENTOR
RICHARD A. ENGELHARDT

ATTORNEYS

Jan. 13, 1970 R. A. ENGELHARDT 3,489,915
COMBINED SOLAR ARRAY BATTERY CHARGER
Filed Oct. 23, 1965 9 Sheets-Sheet 6
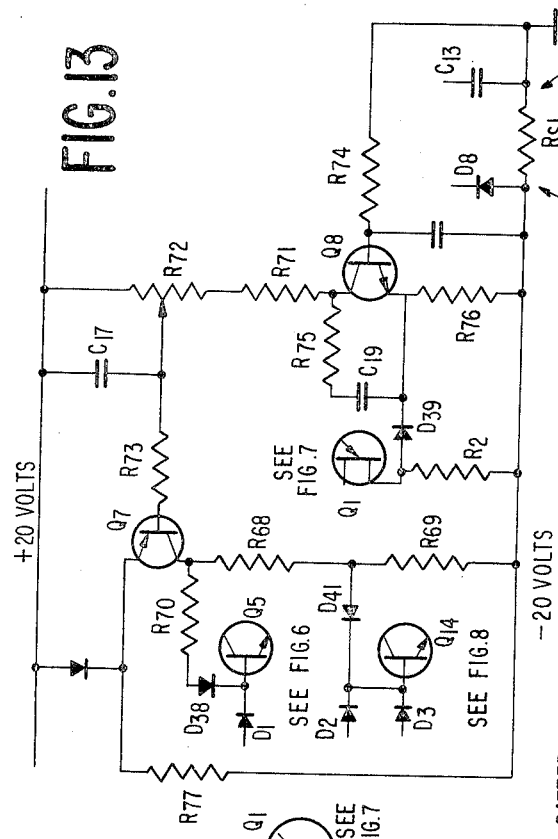
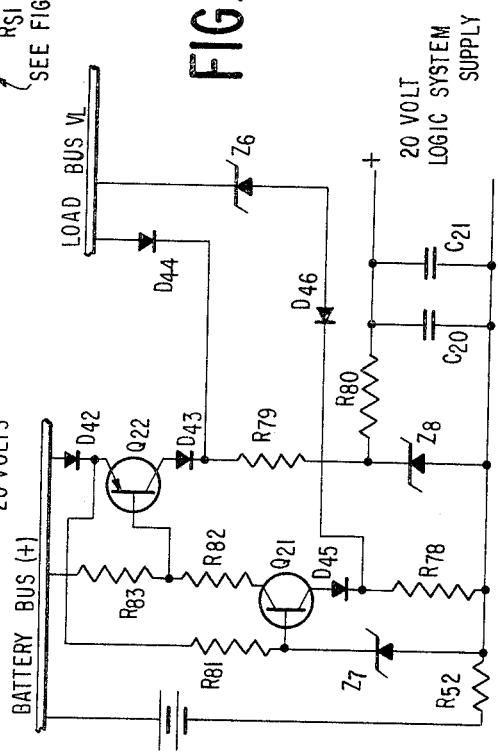
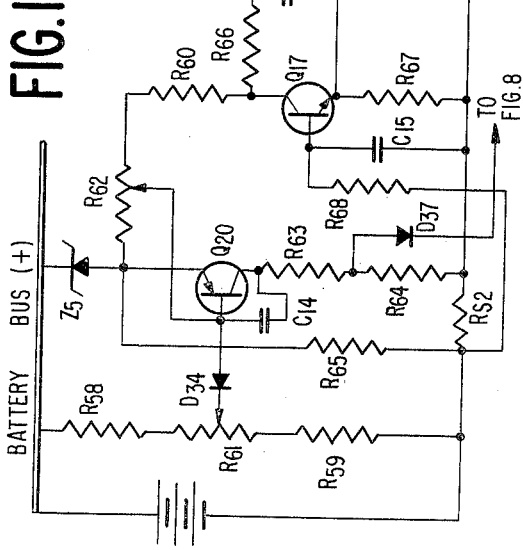
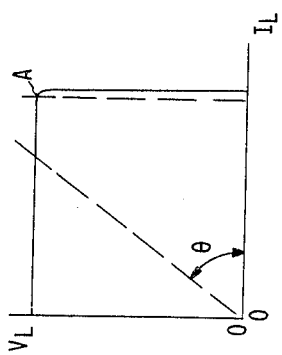
INVENTOR
RICHARD A. ENGELHARDT
BY *Sughrue, Rothwell, Mion, Zinn & Macpeak*
ATTORNEYS

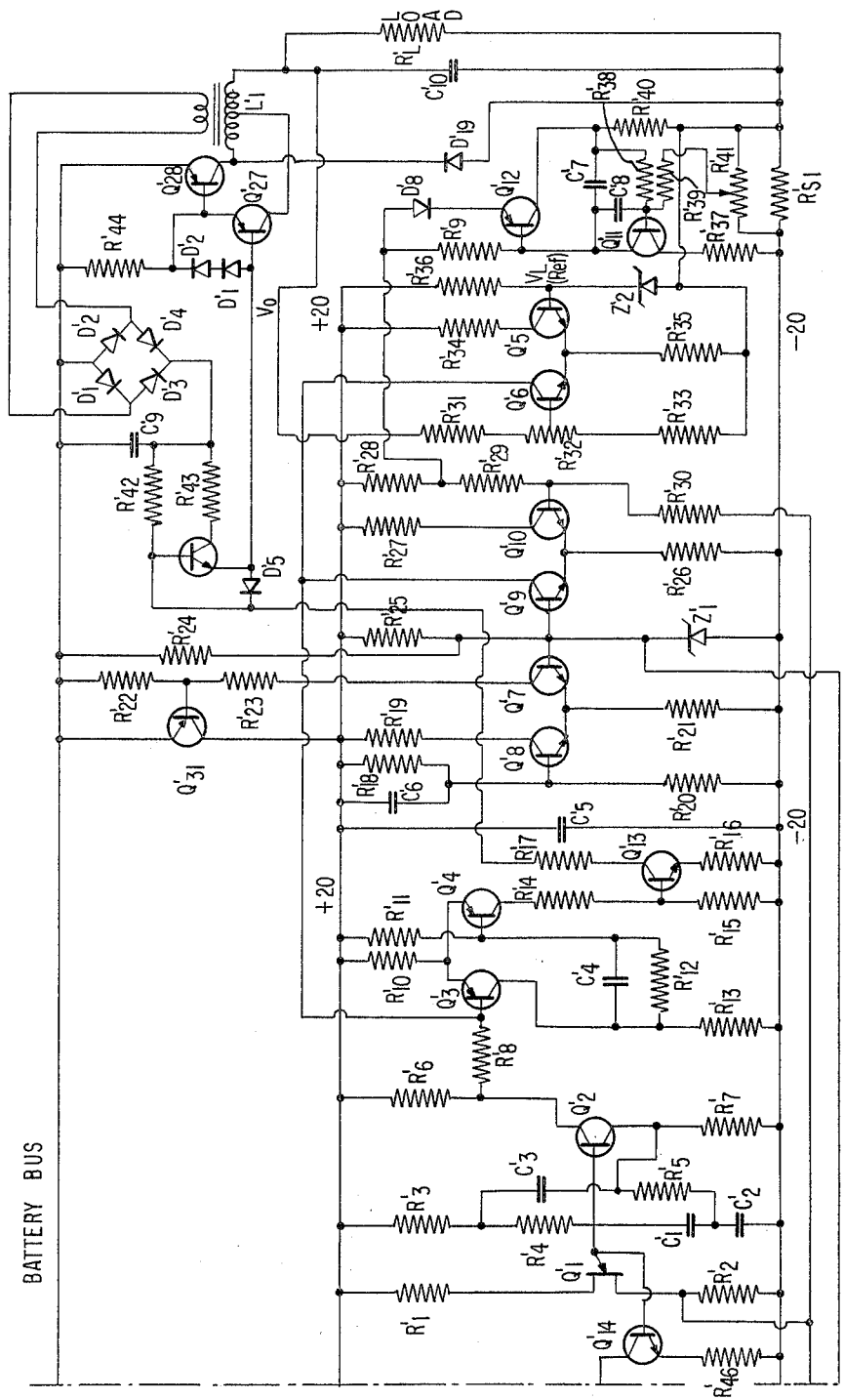

3,489,915
COMBINED SOLAR ARRAY BATTERY CHARGER
Richard A. Engelhardt, Baltimore, Md., assignor to Martin-Marietta Corporation, New York, N.Y., a corporation of Maryland
Filed Oct. 23, 1965, Ser. No. 502,953
Int. Cl. H02j 7/00
U.S. Cl. 307—66                       19 Claims

ABSTRACT OF THE DISCLOSURE

This is a solar cell array power system for use where variations in temperatures and light cause varying solar cell power availability. The solar cell output voltage is compared with a portion of the open-circuit voltage from a test solar cell under the same ambient conditions to determine whether the maximum power available from the array is being used. If it is not, the duty cycles of switches interconnecting the array, the load, and a battery are appropriately adjusted. Similar duty cycle adjustments also effect regulation of load voltage.

---

The invention relates to an apparatus for utilizing maximum power available from a power supply, and more particularly to a system which does so by sharing a load with an internal battery when the power supply is overloaded and by utilizing the internal battery as an additional load when the power supply is underloaded.

It should be understood that the terms "overload" and "underload" are used throughout the specification for ease of expression and have a particular meaning. The word "overload" means that the effective load impedance is *lower* than that which is necessary to achieve maximum available power, and the work "underload" means that the effective load impedance is *greater* than that necessary to achieve maximum available power. The above words are not intended to have any other meaning which may be assigned to them by other articles, patents, dictionaries, etc.

The terms as used herein may at first appear to be contradictory since an underload condition requires for correction, a lowering of the effective impedance. However, the effective impedance is lowered by *adding* the battery in parallel to receive current from the array. Therefore, the term underload is more readily understandable when it is realized that it describes a condition in which more load may be added in parallel.

The invention as described herein is useful with many different types of power sources; however, the invention has particular use with a solar array power source and for purposes of clarity, it will be described with reference to a solar array power source used in an orbiting satellite. In satellite systems, as in many other systems, it is desirable to supply power to certain electrical/electronic subsystems, hereafter called the real load and shown in the drawings as a single resistor. One method of generating such power is to provide solar cells in the orbiting satellite which convert the energy from the sun into electrical energy which is then connected to the loads by an electrical apparatus.

The output voltage-current (V–I) curve of a solar array is non-linear but does have the characteristic of decreasing voltage with increased current drain. The largest voltage is at zero current (open circuit voltage), and the smallest voltage is at the maximum current (short circuit voltage). The particular V–I curve of a solar array is dependent upon a number of variable factors, primarily light intensity and temperature. It should be apparent that a solar array placed in a satellite environment, especially if the satellite is tumbling, will experience varying intensities of light and varying degrees of temperature thereby causing a varying or changing V–I curve for the solar array used. The resulting change in the V–I curve has adverse effects on the utilization of maximum power from the solar array, and thereby affects the efficiency of the system as will be explained below.

For a constant temperature and light intensity the solar array will have a determinable V–I curve and the maximum power output, hereinafter called $P_{max}$, will occur at a certain voltage on the V–I curve which is referred to as the maximum power voltage and will hereafter be designated at $V_{mp}$. It should be noted that the maximum power voltage, $V_{mp}$, for a given V–I curve is not the maximum voltage available on the V–I curve. It is the voltage at which the power $(P=VI=I^2R)$ output from the solar array having a given light intensity and temperature is at a maximum value.

Whether or not the solar array is delivering the maximum power available depends upon whether or not the array electrically sees a load which intersects the V–I curve at the point $V_{mp}$. That is to say, the maximum power is determined by the effective load across the power array, as is well known in the art.

The problem with systems such as those using solar arrays in an orbiting satellite, is that the V–I curve of the solar cells at varying temperatures and varying intensities of light changes. When the V–I curve changes, the $V_{mp}$ also necessarily changes and if the effective load of the system does not concurrently change, then the system will no longer be operating at maximum available power.

Also, in satellite power supply systems, it is necessary to provide power to the load at nighttime when the solar array is not generating power. This power is provided by a battery which is also provided within the satellite. Furthermore, the battery must be recharged by the solar array during daytime periods or otherwise it would become useless after a relatively short period of time. Therefore, it is necessary to provide means in the apparatus which will connect the internal battery to the solar array for the purpose of recharging it during certain periods and for connecting the internal battery to the load for the purpose of supplying power to the load during low or zero power solar array periods.

A further requirement in systems similar to the present invention is that the voltage supplied to a load be maintained at a substantially constant value notwithstanding the variation in the V–I curve of the solar array. This latter requirement creates complications because the desired load voltage is not necessarily the same as the $V_{mp}$ and, furthermore, even though $V_{mp}$ will change with a variation in light intensity and temperature, the load voltage should not change.

In previous space power applications employing solar cells, full usage of the maximum available power which the cells are capable of providing has not been achieved because of the combined characteristics of solar cells, requirements of the power utilizing equipment, and environmental conditions. The ideal situation occurs only when the cells are called upon to deliver to their load system the maximum amount of power which they can produce for the then existing conditions of light intensity and cell temperature. These latter two factors are variables which influence the amount of power that can be developed by a given solar cell. The V–I characteristics are nonlinear but such as to cause an ever decreasing value of voltage for an increasing current drain. As such, there is a particular load impedance, as described above, which will absorb the maximum of power; however, because of changes in the two aforementioned factors, there is no singular impedance or load which satisfies all conditions or combinations of these conditions. The cell potential under maximum power conditions increases significantly as the cell temperature is lowered, and the current available at maximum power increases almost directly with light intensity. Thus, these two variants both cause available power level changes but with very minor effect on the opposite result of voltage as a function of light or current as a function of temperature. A further characteristic is that the voltage at maximum power loading bears an almost constant ratio to the open circuit potential for any condition of temperature and light level.

When a solar array system is directly connected to a load system consisting of a secondary (chargeable) battery and any other power consuming device, the system is maintained at a potential dictated primarily by the battery, and to a much lesser degree by the other load and the other environmental conditions of light and temperature. In such a system, which has been conventional in the past, maximum operating efficiency cannot be maintained for reasons mentioned. With the system of the present invention, maximum efficiency can be maintained with significant savings. With the present system, it has been demonstrated that for a fixed level of illumination, 80% more power was available when the satellite, which was in a lunar orbit, first came out of the dark period and its cells were colder than that which was available when maximum cell temperature was reached. A conventional prior art system would accept only 14% more power whereas the present invention could use all 80% with a resulting savings in array size, weight and cost.

It is therefore one object of this invention to provide an improved system of voltage regulation which maintains a 2% or better variation in regulated voltage.

It is another object of the present invention to provide such a system which continually utilizes maximum available power from a power supply.

A further object of the invention is to provide a system for dividing the power from a solar array efficiently between a load and a rechargeable battery when more power is available than is necessary to maintain the load at a desired voltage and for sharing the load efficiently between the solar array and the battery when additional power is needed to maintain the load at the desired voltage level.

Another object of the present invention is to provid a system capable of determining maximum power for given environmental conditions and efficiently dividing the available power between a solar array, a battery and a load in accordance with the maximum power available.

An additional object of the present invention is to provide a system capable of determining maximum power by sensing the maximum power voltage for given environmental conditions and efficiently dividing the available power between a solar array, a battery and a load (in accordance with the maximum power voltage).

Another object is to eliminate the need for power dissipative devices that increase the load on the array as necessary to limit or reduce the array voltage to useable values.

The above objects are achieved in the present invention by the use of a system which makes use of pulsewidth or duty-cycle control techniques whereby the applied solar array voltage is chopped at a constant frequency but with variable "on" periods to achieve a lower valued D.C. voltage at the output of an appropriate filter. Two such chopping circuits are used in the first embodiment, such that one provides a well regulated load voltage source and the other establishes a charging potential for the battery. The first chopping circuit is regulated so as to maintain a constant voltage output independent of the load and changes in the array voltage, providing, of course, that the latter is always greater than the desired output voltage. However, if the array voltage is less than the desired load voltage a booster may be used. The second is regulated so that the resulting power furnished by the array for charging the battery, when added to the array power furnished to the load circuit in the first mentioned chopping regulator is equal to the maximum power that the array is capable of delivering under the existing array environmental conditions. During "nighttime" operation, the higher battery potential is also chopped so as to maintain the same output voltage at the load as that maintained during "daytime" operation. Also, if necessary, the battery potential may be boosted by conventional means if it is lower than that needed to provide the desired load voltage.

Also, the above stated objects are achieved by a second embodiment in which the solar array is connected through first and second choppers to the load and the battery is connected between the first and second choppers to the load. The second chopper is controlled by a means which measures the load voltage and compares it to the desired load voltage. The first chopper is controlled by a means which senses whether maximum available power is being supplied by the solar array.

The foregoing and other objects, features and advantages of the invention will be apparent from the following detailed description of the invention, as illustrated in the accompanying drawings.

In the drawings:

FIGURE 1a is a graph of typical V–I and power curves for a solar array, and FIGURE 1b is a simple schematic diagram helpful in understanding the graph of FIGURE 1a;

FIGURES 2 and 3, respectively, are graphs showing the effect of light and temperature on the V–I and power curves of a typical solar array;

FIGURE 6 is a schematic diagram of a voltage regulator that may be used in practicing the present invention;

FIGURE 7 is a schematic diagram of an oscillator which may be used in practicing the present invention;

FIGURES 11 and 13 are schematic diagrams of circuits which may be used in the present invention to protect the battery from overvoltage and overcurrent and to protect the load from overcurrent, respectively;

FIGURE 12 is a graph of load voltage versus load current;

FIGURE 14 is a schematic diagram of a logic power supply circuit which may be used in practicing the present invention;

Figure 4:
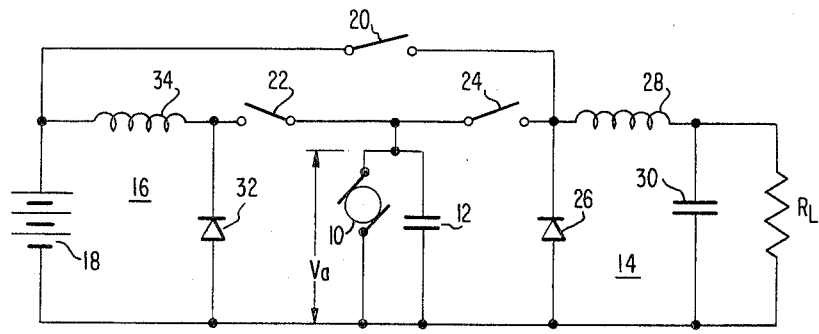
FIGURE 4 is a schematic diagram of a circuit helpful in understanding the concepts involved in the first embodiment of the present invention.

In FIGURE 1a, there is shown the V–I curve of a given solar array for given conditions of light and cell tempertaure. FIGURE 1b shows a load L connected across the output terminals of a solar array 10, and is helpful in understanding the curve shown in FIGURE 1a. It can be seen that the curve of voltage versus current for the solar array has its maximum value, $V_{oc}$, when the array is open circuited and decreases non-linearly to a zero value where the current is $I_{sc}$. $I_{sc}$ occurs when the array is short-circuited. The power available from an array having the V–I curve shown in FIGURE 1a is shown by curve P and exhibits maximum power at point $P_{max}$ which occurs at voltage $V_{mp}$. It is apparent that in order to achieve maximum available power from the array, the output voltage from the array must be at $V_{mp}$.

The effect of a change in the effective load upon the power delivered by the solar array can be seen by referring to FIGURE 1b and curves $L_1$, $L_2$, and $L_3$ in FIGURE 1a. The latter curves are load for different values of a load resistance R. Assume that the effective load resistance R seen by the solar array 10 is that shown by load line $L_1$ in FIGURE 1a. The voltage output from the solar array 10 would be $V_1$, which is slightly greater than $V_{mp}$, and the current drain from the array would be $I_1$. For the load line $L_1$, the power delivered, $P_1$, would be lower than $P_{max}$ and, consequently, the system is not delivering the maximum power which is available. For the particular V–I curve shown in FIGURE 1, a load impedance equal to R would be too high to draw maximum available power, or in other words, the system is considered to be underloaded. In order to achieve maximum available power, it is necessary to increase the load by decreasing the load resistance R until it reaches $R_3$ as shown by load line $L_3$ in FIGURE 1a. Load line $L_2$ shows a condition which occurs when the effective load impedance is too low. In order to achieve maximum available power it would be necessary to decrease the load by increasing the effective load impedance seen by array 10, and thereby shift the load line to coincide with load line $L_3$. When the effective impedance, R, seen by array 10 is at a value which coincides with load line $L_3$, the system is delivering the maximum available power and, therefore, is operating at maximum efficiency.

The effects of changing levels of incident light due to changes in orientation of the satellite or proximity to the sun are shown in FIGURE 2. It will be noted that for two levels of incident illumination, wherein the V–I curves are designated as $V_{L1}$ and $V_{L2}$, respectively, the solar array exhibits approximately the same open circuit (unloaded) voltage $V_{oc}$, but the short circuit load currents $I_{sc}$ differ almost directly in the ratio of their respective levels of illumination. For each level of illumination, there are different values of $I_{mp}$ and $P_{max}$; however, the values of $V_{mp}$ are essentially the same. The effect upon the power output of the solar array of the change in level of incident light is apparent. For example, if the effective load as seen by the solar array is of such a value that the corresponding load line L intersects curve $V_{L2}$ at $V_{2\,mp}$, the system will be delivering the maximum available power which is indicated by $P_{2\,max}$. With that particular load, if the light intensity changes, as indicated by curve $V_{L1}$, the system will then be overloaded (that is, the load impedance is too low), and will not produce the maximum available power which is not $P_{1\,max}$. In other words, the effective load necessary to allow the solar array to deliver its maximum available power is not constant but changes with varying conditions and, therefore, to achieve high efficiency it is necessary to provide some means within the system to change the load which is seen by the solar array. It should be noted that the real load constitutes that part of the overall satellite system, which needs to be supplied with power for operating different circuits within the system. The effective load, which is the impedance seen by the output terminals of the solar array, is made to vary by adding the internal chargeable battery in parallel with the real load and, also, by chopping the output from the solar array which is applied to the real load.

The cell or solar array temperature also has an effect upon the V–I curve as is shown in FIGURE 3. The power curves and the associated voltage versus current curves are shown for a typical solar array at temperature 28° C. and 80° C., respectively. It will be noted that $I_{sc}$ remains essentially constant for changes in temperature but $V_{oc}$ and $V_{mp}$ change significantly. It can also be seen in FIGURE 3 that an effective load, corresponding to load line L, which allows maximum power to be drawn from the solar array at 80° C. would overload the system when operating at 28° C., and an effective load which properly allows the system to deliver maximum power at 28° C. would underload the system when operating at 80° C.

The problems related to the use of solar arrays having characteristics similar to that described in FIGURES 1 through 3 are:
 (1) How to use all available power.
 (2) How to sense the available power.
 (3) How to maintain the voltage at the real load at a desired level.

In the present invention, all the power required by the real load equipment for which the system is to be used will be provided at the desired voltage level with a minimum power loss power regardless of its source, when the array power $P_{max}$ exceeds the real load equipment power demand, the remainder of the power will be used to charge the battery. Inversely when the load requirements exceed the array's optimum $P_{max}$ capability, the internal battery will supply the incremental difference. Thus, the system of the invention always uses all power available from the array, thereby maintaining operation at the optimum load point $P_{max}$ for all environmental conditions.

The basic principles underlying the present invention may be understood by reference to FIGURE 4 which shows a circuit diagram drawn to illustrate the interrelationship between the solar array 10, the internal battery 18 and the load $R_L$. The actual circuitry is more complex and particularly includes voltage reference generating means for controlling the switches 20, 22 and 24 which are shown as mechanical switches in FIGURE 4.

In FIGURE 4, solar array 10 is connected through switch 24 and filter 14 to the load $R_L$. The particular load $R_L$ depends upon the system to which the solar array is connected. For ideal operation during which sunlight is available at all times, solar array 10 would be providing maximum power to the load $R_L$ at all times. However, as explained above, the value of the load impedance seen by the solar array 10 determines whether or not the system is delivering maximum available power and since the environment of the solar cells changes, the effective load necessary to draw maximum available power would also have to change.

The first requirement to be explained with reference to FIGURE 4 is that of voltage regulation. The load $R_L$ is assumed to remain constant and it is desirable to provide a substantially constant D.C. voltage across the load. The latter function is complicated due to the fact that the output voltage $V_a$ of the solar array does not remain constant. A particular voltage regulating circuit which may be used in the invention will be described later but suffice it to say at present that means are provided which senses the D.C. voltage across the load $R_L$ and which controls the switch 24 in accordance with the difference between the actual voltage at $R_L$ and the desired voltage across $R_L$. When switch 24 is closed, the solar array is connected to $R_L$ through filter 14 and when switch 24 is open, the solar array is disconnected from the load $R_L$. Consequently, pulses whose height depends upon $V_a$ and whose width depends upon the time of closure of switch 24, hereafter called on-time, are supplied to the filter 14. Filter 14, which comprises diode 26, inductance 28 and storage capacitance 30, is provided to smooth out the voltage pulses applied thereto and provide a relatively smooth D.C. voltage to $R_L$. For a given voltage $V_a$ out of the solar array, the voltage regulator system controls the on-time of switch 24 to cause the voltage across the load $R_L$ to equal the desired load voltage, $V_L$. If $V_a$ increases, the amplitude of the pulses applied to filter 14 will also increase, thereby causing an increase in the voltage applied to $R_L$. The latter mentioned increase in voltage is detected by a voltage regulator (not shown in FIG. 4) which controls switch 24 by decreasing the on-time. Thus, the pulses now applied to the filter 14 from solar array 10 will have a greater amplitude but a smaller width and thereby the D.C. signal applied across $R_L$ will be maintained at the proper voltage, $V_L$.

It should be apparent that the regulator system must be a feedback system which is responsive to a change in the voltage at the load and reaches a balanced condition over a short period of time. It should also be apparent that the opening and closing of switch 24 which alternately connects and disconnects load $R_L$ to the array 10, has the effect of varying the load impedance seen by the solar array. That is, when array 10 is constantly connected to $R_L$ through switch 24, the array sees the impedance $R_L$ and as the on-time of switch 24 decreases, the array sees an increasing effective load impedance until such time as the switch 24 is constantly opened. When the switch 24 is constantly open, the array 10 is looking into an open circuit and sees an infinite impedance resulting in an output $V_a = V_{oc}$, as described above. Thus, while switch 24 controls the regulation of the voltage which is applied to the real load, it also has an effect on the effective load seen by array 10.

Since the on-time of switch 24 is determined primarily by the voltage regulation circuit, the effective load seen by array 10 which is caused by the switching of switch 24 will not necessarily be the desired effective load which will cause the system to deliver $P_{max}$. It therefore becomes necessary in order to provide the desired effective load which will allow the system to deliver $P_{max}$ under all conditions, to connect the solar array to the battery for charging purposes when additional power is available or to share the real load between the internal battery and the solar array when additional power is needed by the load.

To explain the operation of the invention during an underloaded condition, assume that switch 24 has an on-time controlled by the voltage regulator to provide the proper voltage $V_L$ to the real load. The assumption is that the system is underloaded and, therefore, the effective load, $R_1$, which is seen by the array 10 is indicated by load line $L_1$ in FIGURE 1a.

$$\left(R_1 = \frac{V_1}{I_1}\right)$$

It can be seen by referring to FIGURE 1a that the array will be delivering an amount of power equal to $P_1$ which is less than $P_{max}$. In order for the system to deliver $P_{max}$, the effective load impedance must be decreased so that the load line will intersect $V_{mp}$, as shown by load line $L_3$ in FIGURE 1a. One method of decreasing the effective load impedance seen by array 10 would be to increase the on-time of switch 24, however, that would raise the output voltage and result in a deterioration of the voltage regulation. In other words, if the on-time of 24 were increased for the purpose of decreasing the effective load, the voltage applied across $R_L$ would rise above the desired $V_L$. Therefore, the present invention uses the principle of supplying the remainder of the maximum available power to charge the internal battery 18.

As shown in FIGURE 4, switch 22 controls the connection of array 10 to battery 18 through filter 16. With reference to the direction of the circuitry shown in FIGURE 4, switch 22 controls the effective impedance seen by array 10 looking to the left and switch 24 controls the effective impedance seen by array 10 looking toward the right. The two impedances are added in parallel and switch 22 is controlled by means to be described hereinafter in such a manner as to bring the overall effective impedance seen by array 10 down to the proper value such that the load line of that effective impedance will intersect $V_{mp}$, as shown in FIGURE 1a, for the V–I curve of the array. Switch 22 is turned on only when the voltage delivered by the array is greater than $V_{mp}$. In other words, referring again to FIGURE 1a, switch 22 is turned on only when the load line, such as load line $L_1$, is to the left of the desired load line $L_3$. The latter condition occurs when the effective impedance as seen by the array is greater than that which it should be.

During the conditions described above, a balance is reached between the on-times of switches 24 and 22, and the array which is now delivering $P_{max}$ supplies the desired voltage to $R_L$ and delivers the remainder of its power to internal battery 18 for charging that battery. Consequently, the device is operating at maximum efficiency.

The reverse situation occurs when the effective impedance as seen by array 10 looking toward the right in FIGURE 4 is less than that which will cause the system to deliver maximum power. The latter condition occurs when the effective load is of such a value as to correspond with load line $L_2$ in FIGURE 1a. When the latter condition occurs, the voltage $V_a$ out of the array will equal $V_2$, as shown in FIGURE 1a, and the power delivered will be equal to $P_2$. In order to allow the array to general $P_{max}$, the effective load must be increased, thereby causing the load line to intersect $V_{mp}$ as shown by load line $L_3$ in FIGURE 1a. The use of switch 22 is of no help in increasing the effective load impedance seen by the array because when switch 22 is closed, the impedance of battery 18 is connected in parallel with the real load impedance thereby lowering rather than increasing the effective load. Also, by merely decreasing the on-time of switch 24, the effective load could be increased allowing the array to generate $P_{max}$ but that would result in a lower voltage across the read load. In order to offset these difficulties, a means, not shown in FIGURE 4, senses when $V_a$ (which now referring to FIGURE 1a is equal to $V_2$) is less than $V_{mp}$. When the latter condition occurs, switch 20 is used to connect source 18 through filter 14 to the load $R_L$. The on-time of switch 20 is controlled by the difference between $V_a$ and $V_{mp}$ when $V_a$ is less than $V_{mp}$. In the latter situation, the power to real load $R_L$ is shared by the array 10 and the internal battery 18 wherein both sources provide pulses which are smoothed by filter 14 and connected across $R_L$. By connecting battery 18 across the real load, the voltage across the real load tends to increase above $V_L$. This condition is sensed by the voltage regulator which in turn decreases the on-time of swtich 24 to a value which will bring the voltage across $R_L$ back to the desired voltage $V_L$. This latter condition results in a balancing between the "on-times" of switch 20 and switch 24. The effect of the aforementioned balancing is that the on-time of switch 24 is of such a value as to create an effective load which will draw $P_{max}$ from the array, and the additional power necessary to maintain the voltage across the real load at $V_L$ is supplied by battery 18.

As explained above, the array supplies pulses of energy to $R_L$ through switch 24 and pulses of energy to charge battery 18 through switch 22. To allow continued operation at $P_{max}$, this fluctuation must also be filtered as viewed by the array. Accordingly, a capacitor 12 is placed in parallel with the array so that during the off period of the switches, current from the array replenishes the capacitor's energy given up during the on period. Thus, for a hypothetical case in which the one and off periods are equal, a two ampere current through the switch is obtained as one ampere from the array and one ampere from the capacitor. During the equal off period, one ampere from the array is required to replenish the ampere previously given up by the capacitor. It is not intended to infer that these are constant magnitude values but on the average, they are precise. It should be apparent to those skilled in the art that by using the above-described capacitor, the pulsing load does not cause any significant load change at the array depending on the size of the capacitor and typically it continues to operate at $V_{mp} \pm$ less than 1%.

In the above description of the operation of the system shown in FIGURE 4, it was stated that switch 22 becomes operative when $V_a$ is greater than $V_{mp}$ and the on-time of switch 22 is controlled by the difference in valve between $V_a$ and $V_{mp}$. Also, it was stated that switch 20 becomes operative when $V_a$ is less than $V_{mp}$ and the on-time of switch 20 is controlled by the difference in valve between $V_a$ and $V_{mp}$. Consequently, it is apparent that some means must be provided which will generate a reference voltage that is equal to $V_{mp}$ for comparison with the voltage $V_a$ appearing across the array terminals. The difficulty in generating such a reference voltage lies in the fact that $V_{mp}$ changes for different degrees of temperature and intensities of illumination. However, it can be seen by referring to FIGURES 1 through 3 that although $V_{mp}$ does vary for different temperature and light intensity conditions, it retains a substantially constant relation to the open circuit voltage, $V_{oc}$. It follows that if a voltage source can be found which also varies as a function of the latter two environmental variables, then a comparison can be made between the actual loaded array cell potential, $V_a$, and this source to ascertain when the array is loaded to a level which results in a potential of $V_{mp}$. The best means of obtaining such a source for comparison is to use another, or an unloaded portion of the same solar cell array. As a rough approximation, $V_{mp}/V_{oc}$ varies between .73 and .83 or .78±6.4% for a particular type of solar cell over normal ranges of temperature and illumination. Thus, if the open circuit voltage of a group of individual unloaded "reference" solar cells were 78% of the main power producing array, then by comparison, when the power array load was such that $V_a$ is greater than $V_{ref}$, this would indicate that the full available power was not being utilized and switch 22 would go into operation. Conversely, when $V_a$ is less than $V_{ref}$, the load is in excess of maximum power and switch 20 enters into operation, and when $V_a = V_{ref}$, the load is proper for full utilization. Therefore, the reference voltage which is compared with $V_a$ to control switches 20 and 22 is supplied to the comparator by a 78% pick-off means connected to the open circuit "reference" solar cells.

The open circuit power sensing method described in the above paragraph is only one of several possible solutions to the problem of maximum power sensing. Some other solutions are (1) periodic variation of the load and measuring the variation in the power output and (2) varying the load on the array over a small range and sensing the effective A.C. impedance.

The first alternative method could be implemented by the use of a Hall effect multiplier connected to provide a voltage output equal to the power output of the array and an array regulator which varies the load a small amount. It can be seen by looking at FIGURE 1a that if the load is periodically varied a small amount the power output will be a square wave, the phase of which determines whether an underload or overload condition exists. If the system is delivering maximum available power the load variation will cause excursions on both sides of the $P_{max}$ point on the power curve. Consequently, the output from the Hall effect multiplier would appear as a full rectified square wave with small variation in amplitude.

The second alternative method of sensing whether maximum power is being supplied by the solar array is based on the mathematically provable fact that when the effective load seen by the array is equal to the array internal impedance, the system is supplying maximum available power. In order to determine what the internal impedance of the array is, an array regulator is used to vary the load periodically causing $I_b$ and $V_a$, the current and voltage out of the array to vary. The internal impedance is equal to $$\frac{\Delta V_a}{\Delta I_a}$$

and maximum power is being supplied when $$\frac{\Delta V_a}{\Delta I_a} = \frac{V_a}{I_a}$$

the latter fraction being the effective load impedance. Measurement can be implemented by using two multipliers connected to the solar array, the first having a voltage output equal to $\Delta V_a I_a$ and the second having a voltage output equal to $V_a \Delta I_a$. The multiplier outputs are compared and when equal indicate that maximum power is being supplied. When the two outputs are not equal the sense of the error is indicated by which is the larger.

Figure 5:
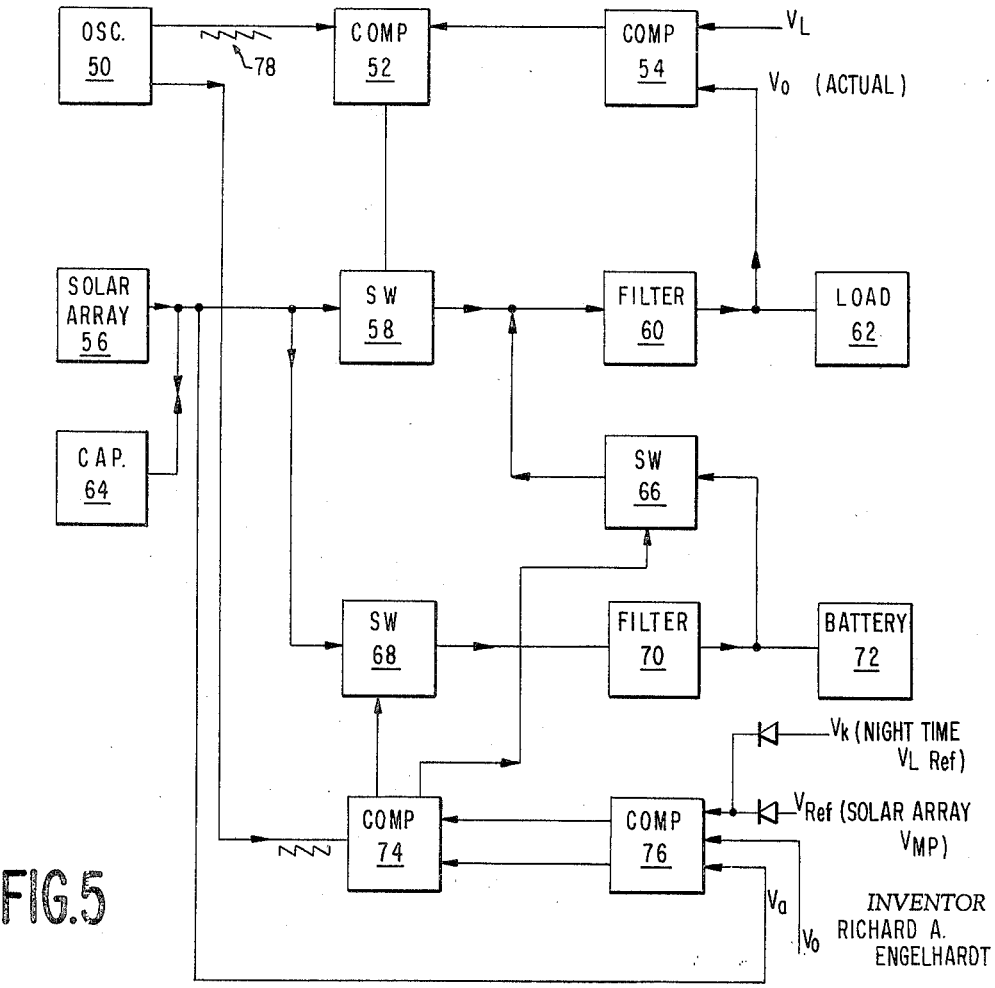
FIGURE 5 is a block diagram of a first embodiment of the invention.

The overall operation of the first embodiment of the invention will be explained with reference to FIGURE 5 which shows the invention in block diagram form. In FIGURE 5, block 50 is a saw-tooth oscillator capable of generating a saw-tooth output which is fed into comparator 52. The shape of the saw-tooth output from oscillator 50 is indicated by wave form 78 adjacent to comparator 52. Also fed into comparator 52 is the output of another comparator circuit, 54, which compares the actual system load voltage, $V_o$, to a desired reference level $V_L$ at the other input. The output of comparator 54, which compares the two input signals and greatly amplifies the difference, is proportional to the difference between the reference voltage $V_L$ and the actual load voltage $V_o$, and the comparator is such that its output becomes more positive when $V_o$ is less than $V_L$. The output of comparator 54 thereby becomes more positive than a portion of the saw-tooth wave form 78 which is applied to comparator 52. Comparator 52 compares the potential output of comparator 54 with the saw-tooth wave 78 and provides an output that controls switch 58 which, by way of reference, is equivalent to switch 24 shown in FIGURE 4. For the embodiment shown, comparator 52 causes switch 58 to turn on when the decreasing saw-tooth potential is equal to the input voltage from comparator 54 and turn off at the end of the saw-tooth cycle. When switch 58 is turned on, solar array 56 is connected to the real load 62 through filter 60, which by way of reference is equivalent to filter 14 in FIGURE 4.

As the output voltage of filter 60 increases such that $V_o$ approaches $V_L$, the output from comparator 54 decreases such that it is more positive than only a later portion of the saw-tooth reference potential during each cycle. In other words, the output potential from comparator 54 is less than the maximum saw-tooth potential $V_P$ and greater than the minimum saw-tooth potential $V_v$. Under the latter described conditions, a stable operating condition is reached since the output of comparator 52 causes switch 58 to turn on for a smilar, but of a proper ratio, portion of each saw-tooth cycle to produce the desired output voltage. If the output voltage tends to rise because of a higher array voltage, $V_a$, the "on" to "total period" ratio of switch 58 decreases, thus decreasing the output voltage again until a new stable ratio is reached. With appropriate system gain, a desired output voltage can be maintained within very small tolerances over a wide range of input voltages.

For charging internal battery 72 which corresponds to internal battery 18 shown in FIGURE 4, comparator 76 performs substantially the same function as comparator 54 except that instead of comparing output load voltage to the desired reference level, it compares actual solar array voltage, $V_a$, to its maximum power level potential, $V_{ref} = V_{mp}$. As described above, $V_{ref}$ may be generated by picking off a certain percentage of the open circuit voltage of reference solar cells. A second input $V_a$ is applied to the comparator 76 directly from the solar array 56. Comparator 76 provides two outputs as is indicated by the two lead lines connected between comparator 76 and comparator 74. The first output is a positive voltage which decreases proportional to the increasing difference between the two aforementioned array and reference potentials but only for the situation where the array potential is higher than the reference potential (maximum power potential), which condition exists when the array is capable of delivering more power. In other words, referring again to FIGURE 1a, the first output from comparator 76 is supplied only when $V_a$ is on a portion of the V–I curve which is to the left of $V_{mp}$. Referring back to FIGURE 5, the first output from comparator 76 is fed to comparator 74 where the comparison between a saw-tooth reference supplied to comparator 74 by oscillator 50 is made as in comparator 52, except that the corresponding output signal from comparator 74 occurs during the early portion of the saw-tooth cycle. In other words, the first output voltage from comparator 76 is compared with the saw-tooth output from oscillator 50 in comparator 74, and the latter comparator supplies an output pulse to switch 68 which has a pulse width beginning at the initiation of each saw-tooth cycle and ending at that portion in the cycle where the first output voltage from comparator 76 is equal to the decreasing saw-tooth voltage. By way of reference, switch 68 is equivalent to switch 22 in FIGURE 4. The output from comparator 74 is fed to switch 68 which connects the array voltage through filter 70 to battery 72 to achieve battery charging. The resulting decreased effective load on the array lowers its potential until a stable operating condition is reached which results in approximate optimum loading by establishing the necessary "on" to "total period" time ratio for battery charging power as described above with reference to FIGURE 4.

The second output from comparator 76 is also fed to comparator 74. This latter output is similar to the first except in this case it exists only for the situation where the array is overloaded and its potential, $V_a$, is lower than the maximum power potential. The latter condition exists, as shown in FIGURE 1a, when $V_a$ is on the V–I curve to the right of $V_{mp}$. That is, the effective load impedance is less than that necessary to produce $P_{max}$ and, therefore, the system is not operating at maximum available power. In order to achieve maximum available power from the array under these conditions and at the same time maintain the voltage across the load at the desired level, $V_L$, it is necessary to share the load between the solar array and the internal battery 72. To accomplish this latter function, the second output from comparator 76 is compared to the saw-tooth voltage in comparator 74 which in turn provides an output for controlling the on-time of switch 66. By way of reference, switch 66 is equivalent to switch 20 in FIGURE 4. The output from comparator 74 turns on switch 66 and thereby connects battery 72 to the load 62 through filter 60. The output pulses from comparator 74 to switch 66 begin at the beginning of each saw-tooth cycle and end at that point in the cycle where the decreasing saw-tooth wave is equal to the second output potential from comparator 76. Therefore, as is apparent from the foregoing description, when the load is being shared by the solar array and the battery, the battery is connected to the load during the beginning of the cycle, whereas the solar array is connected to the load during the latter portion of each cycle. As the battery is periodically connected to the load 62 through filter 60, the load voltage tends to rise above $V_L$ and as a consequence the "on-time" ratio of switch 58 decreases which decreases the load on the solar cell raising its voltage which in turn reduces the "on time" of switch 66 bringing the load voltage back to the desired level. The system reaches a stable condition whereby the battery discharge "on" ratio and the array "on" ratio are each proper to achieve maximum power loading of the array and the desired load voltage. The fact that the output voltages of switches 58 and 66 from their respective sources are not equal is inconsequential as they normally are never closed at the same instant under steady state conditions. During the transitory situation it is possible and probable that both will be closed, however, due to the diode (unidirectional) characteristics of these transistorized switches, no circulating short circuit current will flow and only the one having the higher source potential will conduct current to the filter and load.

Capacitor 64 which is connected in parallel with solar array 56 serves the function of smoothing the array potential as described above with reference to FIGURE 4. Since the array sees pulse-type loading, its potential would fluctuate greatly were it not for capacitor 64. When power is required, the capacitor and the array supply it during the brief "on" cycles. During the "off" cycles, the array tends to recharge the capacitor.

Figures 8, 9:
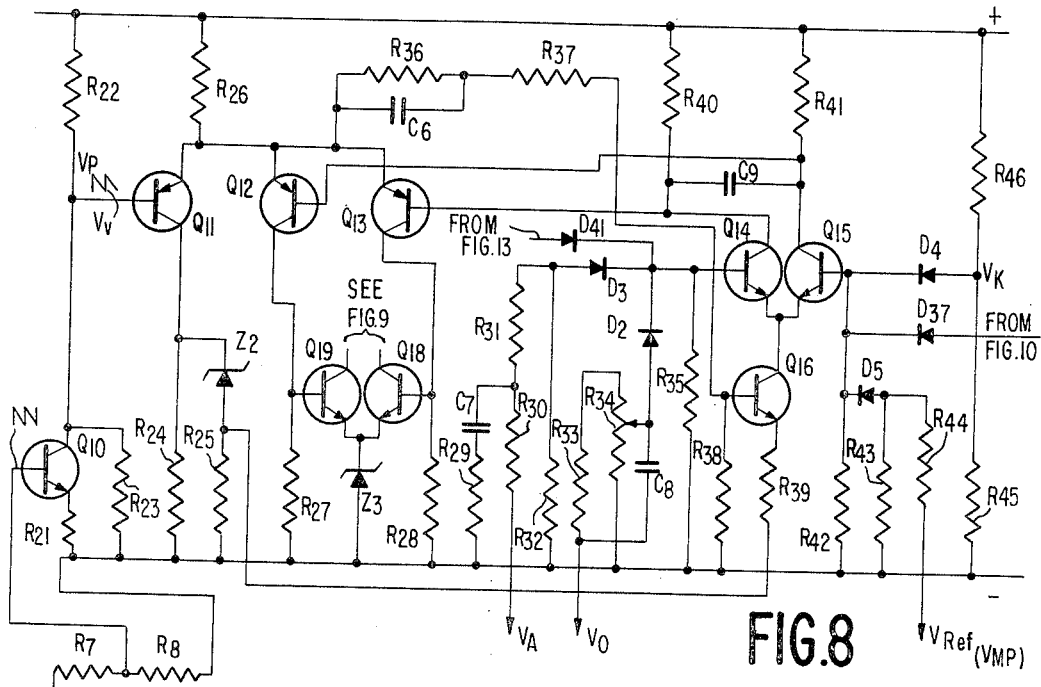
FIGURE 8 is a schematic diagram of the control circuit which may be used in practicing the present invention to control the distribution of available power.
FIGURES 9 and 10 are schematic diagrams of switching circuitry which may be used in practicing the invention.

The system shown in FIGURE 5 also provides for nighttime regulation of voltage. Also applied to the comparator are the voltages $V_o$, which is the actual load voltage $V_k$, which is the nighttime reference voltage. Referring now to FIGURE 8 wherein a portion of that figure is a schematic of comparator 76, it is seen that $V_a$ is applied to the base of $Q_{14}$ through $R_{30}$, $R_{31}$ and $D_3$. $V_{ref}$ is applied to the base of $Q_{15}$ through $R_{44}$ and $D_5$. The differential connection of $Q_{14}$ and $Q_{15}$ with their associated inputs and outputs functions as comparator 76 of FIGURE 5. When $V_a > V_{ref}$ the base of $Q_{14}$ sees the higher voltage and comparator 76 provides the first output to cause battery charging. When $V_a < V_{ref}$ the base of $Q_{15}$ sees the higher voltage and comparator 76 provides the second output to cause the battery to be connected to the load.

As nighttime approaches it is apparent that the solar array output, both open circuited and loaded, goes to zero thus causing $V_a = V_{ref} = 0$. Under this condition it is necessary for all power to the load to be supplied by the battery. Since $V_a$ and $V_{ref}$ are zero they can no longer control comparator 76. In order to provide nighttime control, $V_o$ is stepped down by $R_{33}$ and $R_{34}$ and applied to the base of $Q_{14}$, and $V_K$ is applied to the base of $Q_{15}$. $V_K$ is generated by picking off a portion of the regulated 20-volt drop which is generated by means explained hereinafter. It should be noted that both $V_K$ and stepped down $V_o$ are small compared with the values of $V_a$ and $V_{ref}$ during daytime operation and therefore do not interfere with the comparison of the latter two voltages.

The value of $V_K$ is selected so that stepped down $V_o$ is equal to $V_K$ when $V_o$ equals $V_L$.

Nighttime operation is as follows. As night approaches, $V_a$ and $V_{ref}$ tend toward zero. Also, the voltage contributed to the load by solar array 56 tends toward zero. Voltages $V_K$ and $V_o$ take over and it initially appears to transistors $Q_{14}$ and $Q_{15}$ that $V_{ref}$ is much greater than $V_a$ when in actuality it is $V_K$ which is much greater than $V_o$ stepped down. The comparator in response to this difference tends to operate switch 66 (FIGURE 5) so that the battery 72 is connected to the load full time. Since the battery is the only source of power now available if it is not great enough to supply the desired voltage, $V_L$, to the load 62, the condition is not correctable. However, if the battery is large enough to supply the desired $V_L$ to the load, regulation takes place. Assuming battery 72 is capable of delivering the needed power at a voltage greater than $V_L$, the voltage at the load, $V_o$ tends to rise above $V_L$ if switch 66 is closed full time. The comparator 76 which comprises transistors $Q_{14}$ and $Q_{15}$ detects this condition because when $V_o > V_L$ then $V_o$ "stepped down" $> V_K$. To the transistors, it appears that $V_a$ is approaching the value of $V_{ref}$ and the comparator thereby reduces its output to decrease the on-time of switch 66 to maintain $V_o$ equal to $V_L$.

FIGURE 6 shows a schematic diagram of a circuit which is capable of performing the functions of block diagrams 54 and 52 in FIGURE 5. It will be noted that a regulated power supply indicated by the +20 and −20 volt lines in the drawing are connected across the circuit. The +20 and −20 lines indicate respectively the positive and negative sides of a 20-volt drop. The manner in which the regulated power supply signals are generated will be explained later. Transistor $Q_5$ and $Q_6$ form a first differential amplifier which compares the actual voltage at the load, $V_o$, with a desired reference voltage $V_L$. The voltage $V_L$ is generated by series connected resistors $R_{15}$, $R_{16}$, $R_{17}$ and pickoff means connected between $R_{16}$ and the base of $Q_6$. The actual voltage $V_o$ is sensed by connecting the bottom of resistance $R_{18}$ to the actual load at a point corresponding to the top of $R_L$ in FIGURE 4. Due to the connections of resistances $R_{18}$, $R_{19}$, $R_{20}$, and $R_2$ the voltage appearing across $R_{20}$ and $R_2$, which is applied to the base of $Q_5$, is proportional to the actual voltage across the load. The differential error voltage (with respect to —20) appearing at the collector of $Q_5$ decreases as $V_o$ becomes slightly $>V_{ref}$ and is applied to the base of $Q_4$ which forms in conjunction with transistor $Q_3$ a second transistorized differential amplifier. The signal output from the oscillator, oscillator 50 as described in FIGURE 5, is applied to the base of $Q_3$ and the circuit parameters are arranged so that $Q_4$ conducts when the oscillator voltage is greater than the differential error voltage and $Q_3$ conducts when the error voltage is greater than the oscillator voltage. The conduction of transistor $Q_3$, although not shown in FIGURE 6, controls the "on" time of switch 58, shown in FIGURE 5, which is connected between the solar array and the load.

A particular oscillator capable of generating the desired sawtooth waveform is shown in FIGURE 7. The oscillator comprises primarily a transistor $Q_2$, storage capacitors $C_1$ and $C_2$ and a unijunction transistor $Q_1$. The circuit shown in FIGURE 7 is quite conventional and except for minor variations is similar to that shown on page 196 of the General Electric Transistor Manual, 6th edition. The additions to the General Electric circuit are resistors $R_2$, $R_9$ and $R_{10}$. When the energy stored in capacitors $C_1$ and $C_2$ discharges through the unijunction transistors, the voltage created across $R_2$ is used in several other circuits of the overall system. The output sawtooth voltage, taken from the junction between resistors $R_9$, and $R_{10}$, is applied to the base of transistor $Q_3$ in FIGURE 6.

As explained in conjunction with the description of FIGURE 5, a saw-tooth signal from the oscillator must also be applied to the comparator 74. That saw-tooth signal is picked off from the junction of resistances $R_7$ and $R_8$ in FIGURE 7 and applied to the comparator which is shown in detail in FIGURE 8.

The circuit of FIGURE 8 is a schematic diagram of a transistorized circuit which is capable of performing the functions which are performed by comparators 76 and 74 as described in conjunction with FIGURE 5. Transistors $Q_{14}$ and $Q_{15}$ are differentially connected and have applied to their bases the actual voltage supplied by the solar array, $V_a$, and the reference voltage, $V_{ref}$ ($V_{mp}$). Outputs from the differential amplifiers are taken from the respective collectors of transistors $Q_{14}$ and $Q_{15}$ and applied to the bases of transistors $Q_{13}$ and $Q_{12}$. Transistors $Q_{11}$, $Q_{12}$ and $Q_{13}$ form a triferential amplifier. The term triferential is used to indicate that the circuit compares the error signals to each other and also to a reference sawtooth voltage which is supplied to the base of transistor $Q_{11}$.

When $V_a$ is equal to $V_{ref}$, the voltage on the collector of transistor $Q_{14}$ will be equal to the voltage on the collector of transistor $Q_{15}$ and the circuit parameters are arranged so that both of the latter voltages are greater than $V_p$ of the saw-tooth signal applied to transistor $Q_{11}$. ($V_P$ is the peak amplitude of the saw-tooth signal.) When the latter condition occurs, transistor $Q_{11}$ conducts. It should be noted that in FIGURE 8, transistors $Q_{11}$, $Q_{12}$ and $Q_{13}$ are PNP transistors and the one having the lowest signal on its respective base will be conducting.

When $V_a$ is greater than $V_{ref}$, the voltage on the collector of transistor $Q_{14}$ will be less than the voltage on the collector of transistor $Q_{15}$ and also will be less than the saw-tooth voltage for all or a part of the oscillator period. When this condition occurs, transistor $Q_{13}$ will conduct for that portion of the oscillator period during which the voltage on the collector of $Q_{14}$ is less than the saw-tooth amplitude. As explained previously in conjunction with FIGURE 5, when $V_a$ is greater than $V_{ref}$, switch 68 which connects the solar array to the battery will be operated. Transistor $Q_{13}$, which conducts during the latter-described condition, controls the "on" time of switch 68, not shown in FIGURE 8.

When $V_a$ is less than $V_{ref}$, the voltage on the collector of transistor $Q_{15}$ will be less than the voltage on the collector of $Q_{14}$ and therefore transistor $Q_{12}$ will conduct for that portion of the total oscillator period during which the error signal is below the saw-tooth amplitude. Transistor $Q_{12}$ controls switch 66 (shown in FIGURE 5).

The switching circuits shown by blocks 58, 68, and 66 in FIGURE 5 may be transistorized circuits which utilize a pair of transistors in a Darlington configuration as the switching transistor. A particular circuit which may be used for switch 58 is shown in FIGURE 9 wherein the Darlington pair comprises transistors $Q_{28}$ and $Q_{27}$. The real load is indicated by resistance $R_L$, and filter 14 which comprises diode 26, inductance 28, and capacitance 30 corresponds to filter 60 of FIGURE 5. Also, it should be noted that transistor $Q_3$, diode $Z_1$ and resistance $R_{17}$ are the same parameters as shown in FIGURE 6. As previously explained in conjunction with FIGURE 6, the turn-on time of transistor $Q_3$ controls the "on" time of switch 58. The operation of the circuit shown in FIGURE 9 is as follows. When the transistor $Q_3$ conducts, the voltage across $Z_1$ and $R_{17}$ is higher than the breakdown voltage of the Zener diode in the emitter circuit of transistor $Q_9$, thus causing the latter transistor to turn on and conduct. The current which results and flows into the collector of $Q_9$ from the power array bus $V_a$ through the emitter-to-base circuits of $Q_{28}$ and $Q_{27}$ in series creates a voltage drop across the diode between emitter and base of $Q_{29}$ causing the latter to be back-biased and turned off. There is also a slight flow of current from $V_a$ through the bridge rectifier circuit which includes four diodes arranged in a bridge, and the resistor connected to the base of transistor $Q_{29}$. The current which flows through the emitter-base connections of $Q_{28}$ and $Q_{27}$ causes $Q_{28}$ to turn on, thus applying the signal $V_a$ to the input of the inductance 28 of the load filter circuit 14 and providing the array current to load. The collector of $Q_{27}$ is tapped as shown in the drawing on the inductance 28 to permit a lower collector-to-emitter voltage on $Q_{28}$ when the latter is conducting than is normally achieved in a Darlington circuit.

When $Q_3$ and $Q_9$ turn off, there is no longer any current flow through the base-to-emitter connected diode of transistor $Q_{29}$ and therefore that transistor turns on providing a flow of current in the reverse direction through the emitter-base circuits of $Q_{27}$ and $Q_{28}$ to quickly drive out the electrons necessary for a first turn-off of switching transistor $Q_{28}$. After turn-off, a reverse bias across both $Q_{27}$ and $Q_{28}$ is maintained by the bypass circuit consisting of the two diodes and the high ohmic resistor.

The same basic technique as shown in FIGURE 9 may be used for all three of the switching circuits shown in FIGURE 5. The total power switching circuitry which includes the array-to-load switch 58, the array-to-battery switch 68, and the battery-to-load switch 66 (all shown in FIGURE 5) are shown schematically in FIGURE 10. It should be noted in conjunction with FIGURE 10 that switching transistor $Q_{28}$ corresponds to switch 58 of FIGURE 5, switching transistor $Q_{25}$ corresponds to switch 68, and switching transistor $Q_{23}$ corresponds to switch 66. The remainder of the circuitry for each switch is substantially similar to that shown in FIGURE 9 for each individual switch. Also indicated in FIGURE 10 are the circuit connections between the power switching circuitry and the remaining circuits of the overall system.

Figure 10:
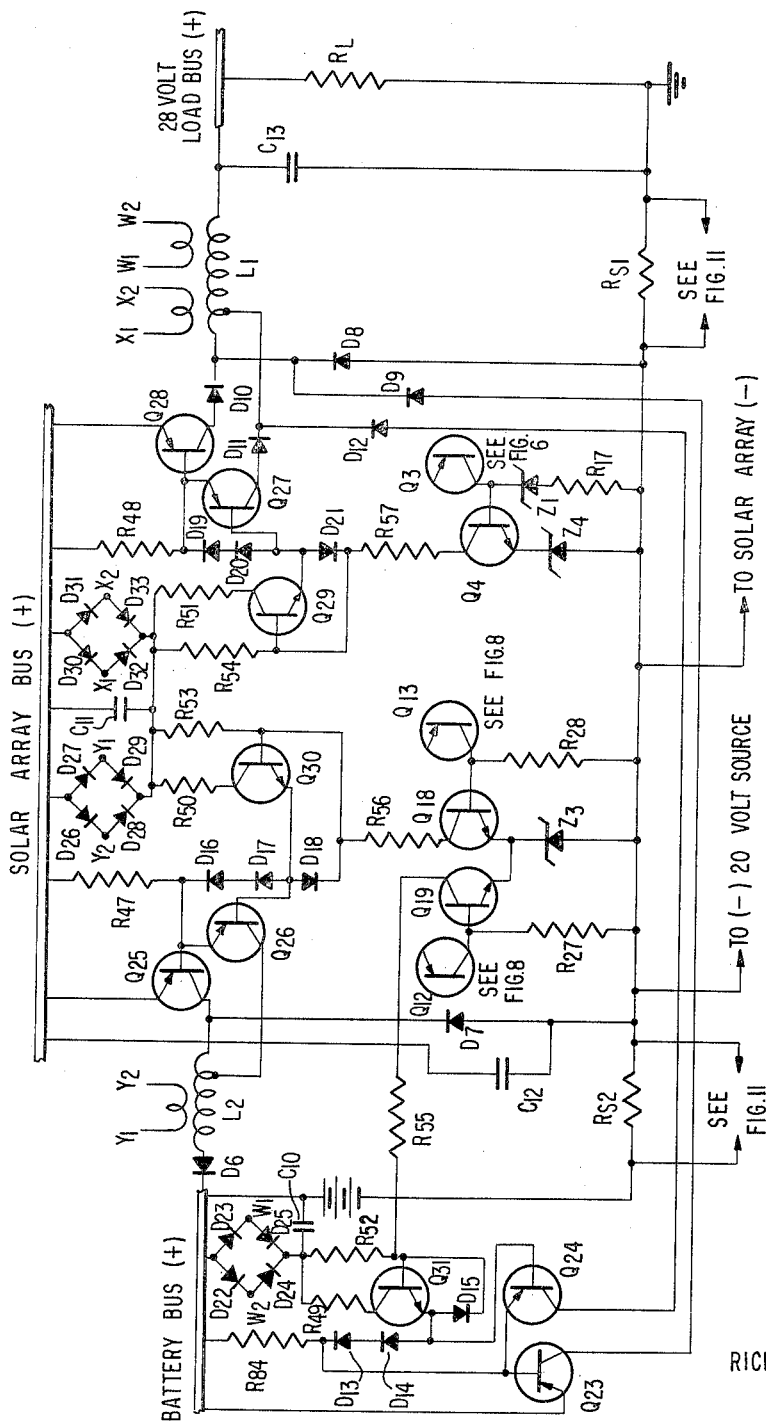

It will be noted that in FIGURES 9 and 10 the filter inductances are provided with secondary coils which are connected respectively to four-diode full wave bridge rectifiers. The latter connections provide a D.C. voltage which is added to the supply source voltage thus providing a back-bias source.

In conjunction with the above-described circuitry and with the overall system shown in FIGURE 5, it may be necessary to provide an additional means which will prevent gassing of the internal battery. Gassing of the battery may be caused by the application of a charging potential which is too high as viewed at the output of the battery charging filter 60 (shown in FIGURE 5). The latter function may be performed by a circuit such as that shown in FIGURE 11, which limits the charging circuit on-time when a potential which is too high is reached.

With reference to FIGURE 11, both $Z_5$ in series with $R_{65}$ and the series circuit consisting of $R_{58}$, $R_{61}$ and $R_{59}$ are connected directly across the battery. When the battery potential is raised, when under charge, to a value such that the drop across $R_{58}$ and the portion of $R_{61}$ to the adjustable tap begins to exceed the fixed value of that of the Zener diode $Z_5$, transistor $Q_{20}$ is driven into a conducting state. The resulting collector current creates a voltage drop through $R_{64}$ which results in a rise of potential above the —20 volt line at the junction of $R_{63}$ and $R_{64}$. The magnitude of this potential is a function of the gain in this transistor circuit and the differences in the base and emitter voltages. Even a 0.1 volt difference can be ample to produce the drop desired across $R_{64}$. This latter voltage is fed through a diode $D_{37}$ into the base of transistor $Q_{15}$. Referring back to FIGURE 8, it will be recalled that during the charging mode (that is, when the array is charging the battery), the base of transistor $Q_{14}$ is higher than that of transistor $Q_{15}$ ($V_a$ greater than $V_{ref}$ ($V_{mp}$)). However, when battery potential reaches the critical limiting value discussed above, the voltage drop across $R_{64}$ becomes slightly greater than that of $R_{43}$, the latter being established by $V_{ref}$, so that now the $R_{64}$ voltage drop is compared to $V_a$ and results in a decreased differential between $Q_{14}$ and $Q_{15}$ with the corresponding reduction in battery charging "on-time" and in charging current. This thereby limits charging current to whatever value will maintain the upper limit of battery potential desired which in turn is set by resistance 61 and the adjustable tap setting shown connected thereto. When this situation occurs, the array may no longer be loaded to its maximum power point and the excess is not used. This in no way affects the load regulator circuit other than to allow its input voltage to rise slightly above $V_{mp}$, but its regulator senses this fact and changes accordingly. No dissipator circuits are added and there is no need for them.

The purpose of $C_{14}$ in FIGURE 11 is to filter out the slight ripple in battery charging potential brought about by the pulsating charging circuit and at the basic oscillator frequency. That circuit possesses a low pass filter characteristic with high attenuation of the ripple frequency so that the resultant drop across $R_{64}$ is essentially a pure D.C. value, thus eliminating any oscillation in operation.

Also, shown in FIGURE 11 is the means for providing current limiting either as a necessity due to transistor capabilities or for reasons dictated by battery limitations. When the charging current into the battery creates a drop across a suitable ammeter type shunt $R_{S2}$ (shown both in FIGURES 10 and 11), that is of sufficient amplitude to cause transistor $Q_{17}$ to conduct, current passes through resistor $R_{62}$ and a voltage drop results. A portion of this drop is impressed across the emitter-base connection of $Q_{20}$ through diode $D_{35}$ so that, depending on the setting of the adjustable tap on $R_{62}$, when a particular battery charging current level is reached, $Q_{20}$ will conduct and produce a change in charging cycle on-time in the same manner as before for voltage limiting except now it will limit to the maximum set current or voltage, whichever is the limiting criteria. Resistor $R_{68}$ and capacitor $C_{15}$ provide a low-pass filter to smooth out the ripple in the battery charging current, $R_{66}$ and $C_{16}$ provide time-delay and reset of the early turn-off for the remainder of each oscillator cycle. The synchronizing pulse from $Q_1$ and $R_2$ provides the reset at the end and thereby a more constant value of reduced charging current results without oscillating as a function of the time delaying constants. Such a circuit has a rapid response characteristic to suddenly applied charging currents.

Additional circuitry may also be necessary to provide overcurrent protection in the load circuit. Such a circuit may be similar to the battery protection circuit shown in FIGURE 11 except that in the case of load-overcurernt protection it is necessary that the circuitry distinguish whether the source of power is the battery, the power array, or both. One such circuit which is capable of performing the desired function is shown in FIGURE 13. However, before referring to FIGURE 13, it may be helpful to understand the load voltage-current output diagram which is shown in FIGURE 12. FIGURE 12 is a curve of load voltage $V_0$ versus load current $I_0$ and includes a dotted load line which corresponds to an effective load impedance $R_L$, where $R_L = \tan \theta$. For all loads up to point A, the output will remain at its normal regulated value due to the voltage regulation system described previously. Thus, as the load current increases, the effective resistance load line shifts to reduce angle theta, and after passing through A, when theta is decreasing, the voltage will fall off rapidly, whereas the current will remain essentially constant, increasing only slightly.

In FIGURE 13, transistors $Q_7$ and $Q_8$ perform functions similar to that of transistors $Q_{20}$ and $Q_{17}$, respectively, in FIGURE 11 as applicable to overload currents. However, in FIGURE 13, ammeter shunt $R_{S1}$ is used as the load current sensing element and the regulated 20-volt source is used for power. The output signal which will be used for reducing the on-time and thus the output voltage will be obtained from the voltage drops across the resistors in the collector circuits of transistor $Q_7$. When operation is such that all load power is being supplied by the array, the voltage drop across $R_{68}$ and $R_{69}$ in series is fed through resistor $R_{70}$ and diode $D_{38}$ to the base of $Q_5$. When this voltage is greater than that being fed from the load voltage feedback circuit of FIGURE 6 through diode $D_1$, the regulator system of FIGURE 6 believes the output voltage is too high to limit the current to a set value, so it causes the on-time of the appropriate switch to decrease. The voltage drop of $R_{69}$, which will be used for nighttime current limiting value is lower but of insufficient magnitude to cause any change in the system to which it is connected.

During nighttime operation, the aforementioned voltage across $R_{69}$ will be fed into the base of transistor $Q_{14}$ through diode $D_{41}$, and being higher than that from $D_2$ (see FIGURE 8), the same action as that above occurs. The action of the higher voltage across $R_{68}$ and $R_{69}$ will have no effect on the daytime regulator since there is no array power available at this time.

For the situation when the load is being shared by the array and the battery, a more complex explanation is needed but, nevertheless, the result is the same. Referring back to the above discussion wherein the array was supplying the load, any overload current reduces the "on" time. In so doing, it also reduces the power loading, since output voltage falls more rapidly than current increases. Thus, the array load decreases and the result would have been to increase battery charging power a like amount. Recalling the action which takes place pertaining to the circuit of FIGURE 8, during this load sharing in which the battery also supplies power to the load, the amount which the battery is supplied is equal to that which would overload the array. Thus, when this overcurrent situation occurs, the action of unloading the power which the array provides to the load circuit also reduces the amount of power which the battery circuit must provide to maintain optimum-maximum power loading of the array. Therefore, the battery discharge on-time also decreases and will go to zero when the reduced voltage load power equals that available from the array. If the latter unloading is such that unused array power is available, the battery will go into a charging mode. Thus, there are no additional circuits required under this operation since the other circuits described react in a manner to provide the result desired.

In the description of the above circuitry, much of the power necessary to operate that circuitry is shown as being supplied by a +20 volt bus and a −20 volt bus. Therefore, it is obvious that a logic system power supply is necessary to provide the regulated 20-volt operating voltage. One circuit which is capable of performing that desired function is shown in FIGURE 14. The logic system power supply circuitry is connected to the battery bus which is a conductor that is electrically connected to one of the battery terminals, and to the load bus which is a conductor connected to the real load. When the load bus voltage is above approximately 26 volts, the voltage drop across $R_{78}$ as a result of current through $Z_6$ and $D_{46}$ is greater than the Zener voltage of $Z_7$ thereby preventing $Q_{21}$ from conducting. This also prevents $Q_{22}$ from conducting. The logic system supply current then comes from the load bus through diode $D_{44}$ and $R_{79}$ and the voltage at the junction of $R_{79}$ and $R_{80}$ is clamped at a 22-volt level by the action of $Z_8$. The drop across $R_{80}$ caused by the logic system average current demand and as filtered by $C_{20}$ and $C_{21}$ further reduces this voltage so that at the output it is approximately 20 volts.

During initial start-up or during load overcurrent situations when the load bus is less than 26 volts, $Q_{21}$ conducts turning on $Q_{22}$. When this latter transistor turns on, the battery bus becomes a source for the current being fed to $R_{79}$. The effect thereafter is the same as when the load bus was the supply source. The higher battery voltage is prevented from feeding back to the load bus by diode $D_{44}$. Thus, this circuit derives power from either the load bus or the battery, but chooses the former source which normally is at the lower potential as long as it is above 26 volts. By so doing, the losses in the Zener diode $Z_8$ regulating circuits are minimized.

The circuits shown in FIGURES 6 through 14 are included only by way of example and it is not intended that the invention be limited to these identical circuits. These circuits show only one type of circuitry which is capable of performing the functions described in conjunction with the block diagram shown in FIGURE 5, and it will be understood by those skilled in the art that various other circuits may be used which perform the identical functions. However, if the circuits shown in FIGURES 6 through 14 are used in practicing the invention, the following parameters may be advantageously used:

$R_1$—330
$R_2$—27
$R_3$—10K
$R_4$—22K
$R_5$—18K
$R_6$—220
$R_7$—1K
$R_8$—820
$R_9$—15K
$R_{10}$—270
$R_{11}$—390
$R_{12}$—8.2K
$R_{13}$—2.2K
$R_{14}$—2.7K
$R_{15}$—4.7K
$R_{16}$—10K
$R_{17}$—33
$R_{18}$—15K
$R_{19}$—8.2K
$R_{20}$—4.7K
$R_{21}$—18K
$R_{22}$—5.6K
$R_{23}$—7.5K
$R_{24}$—1K
$R_{25}$—56
$R_{26}$—820
$R_{27}$—22K
$R_{28}$—16K
$R_{29}$—1K
$R_{30}$—18K
$R_{31}$—15K
$R_{32}$—3.3K
$R_{33}$—27K
$R_{34}$—5K
$R_{35}$—390K
$R_{36}$—27K
$R_{37}$—3.3K
$R_{38}$—4.7K
$R_{39}$—330
$R_{40}$—4.7K
$R_{41}$—4.7K
$R_{42}$—390K
$R_{43}$—3.3K
$R_{44}$—3.3K
$R_{45}$—2.7K
$R_{46}$—18K
$R_{47}$—3.3K
$R_{48}$—3.3K
$R_{49-51}$—47
$R_{52-54}$—1K
$R_{55}$—680
$R_{56}$—1.2K, 1 w.
$R_{57}$—1.2K 1 w.
$R_{51,52}$—0.025
$R_{58-60}$—10K
$R_{61-62}$—5K
$R_{63}$—1.5K
$R_{64}$—5.6K
$R_{65}$—18K
$R_{66}$—220K
$R_{67}$—27K
$R_{68}$—15K
$R_{69-71}$—10K
$R_{72}$—2.5K
$R_{73-74}$—1K
$R_{75}$—220K
$R_{76}$—27K
$R_{77}$—22K
$R_{78}$—680
$R_{79}$—68
$R_{80}$—39
$R_{81}$—15K
$R_{82}$—39K
$R_{83}$—12K
$R_{84}$—3.3K $C_1$—0.1 mfd.
$C_2$—0.045 mfd.
$C_3$—1.0 mfd.
$C_4$—0.68 mfd.
$C_5$—0.01 mfd.
$C_6$—0.22 mfd.
$C_7$—0.47 mfd.
$C_8$—0.22 mfd.
$C_9$—0.1 mfd.
$C_{10}$—82 mfd.
$C_{11}$—82 mfd.
$C_{12}$—6100 mfd.
$C_{13}$—6100 mfd.
$C_{14}$—0.47 mfd.
$C_{15}$—0.47 mfd.
$C_{16}$—2.0 mfd.
$C_{17}$—0.01 mfd.
$C_{18}$—0.047 mfd.
$C_{19}$—2.0 mfd.
$C_{20}$—82 mfd.
$C_{21}$—82 mfd.

$Z_1$—1 N 753A
$Z_2$—1 N 753A
$Z_3$—1 N 750A
$Z_4$—1 N 750A
$Z_5$—1 N 965B
$Z_6$—1 N 3028B
$Z_7$—1 N 746A
$Z_8$—1 N 2985B $Q_1$—2 N 489
$Q_2$—2 N 335
$Q_3$—2 N 526
$Q_4$—2 N 526
$Q_5$—2 N 335
$Q_6$—2 N 335
$Q_7$—2 N 526
$Q_8$—2 N 634A
$Q_9$—2 N 498A
$Q_{10}$—2 N 635
$Q_{11-13}$—2 N 526
$Q_{14}$—2 N 634A
$Q_{15}$—2 N 634A
$Q_{16}$—2 N 635
$Q_{17}$—2 N 634A
$Q_{18}$—2 N 498A
$Q_{19}$—2 N 498A
$Q_{20}$—2 N 526
$Q_{21}$—2 N 335
$Q_{22}$—2 N 1358
$Q_{23-28}$—2 N 1358
$Q_{29-31}$—2 N 634A $D_{1-5}$—1 N 645
$D_{6-10}$—1 N 2577
$D_{11-12}$—1 N 538
$D_{13-41}$—1 N 645
$D_{42-44}$—1 N 538

Figure 15:
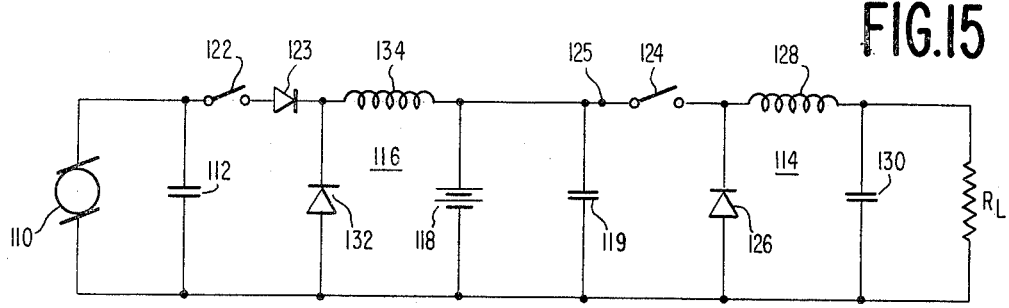
FIGURE 15 is a schematic diagram of a circuit helpful in understanding the principles of operation of the second preferred embodiment of the invention.
Figure 16:
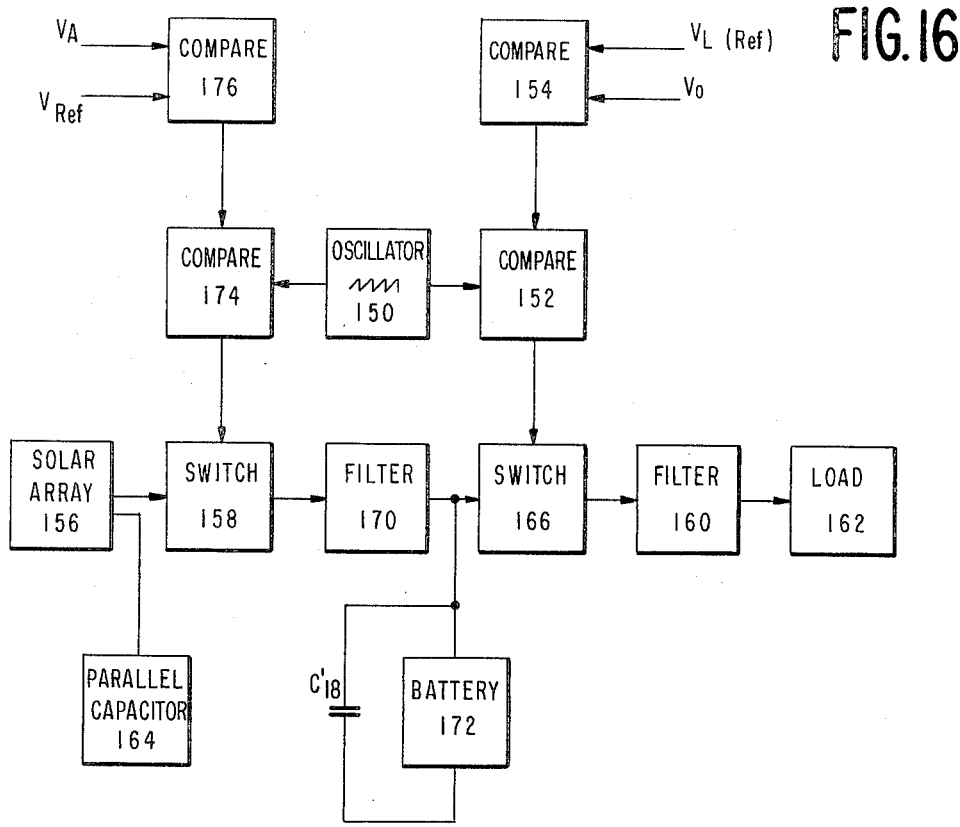
FIGURE 16 is a block diagram of a second preferred embodiment of the invention.
Figure 17A:
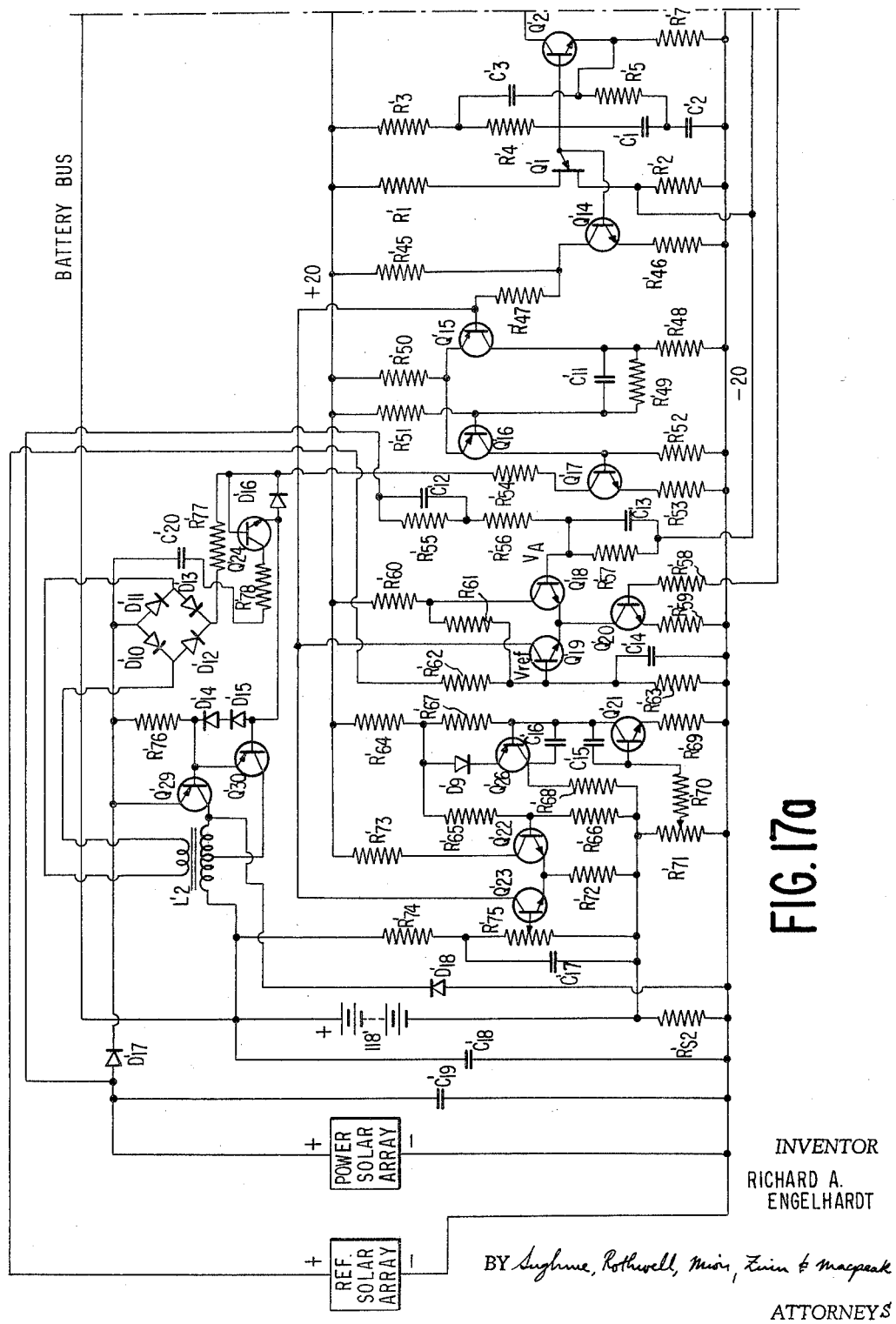
FIGURE 17, which is divided into 17a and 17b, is one type of circuit which may be used to implement the block diagram of FIGURE 16.

A second preferred embodiment of the invention is shown in block diagram form in FIGURE 16 and in schematic form in FIGURE 17. The schematic diagram in FIGURE 15 is helpful in explaining the theory of operation of the second preferred embodiment.

In FIGURE 15 which is somewhat similar to FIGURE 4, there is a solar array 110, having a capacitor 112 connected in parallel therewith. The output of the solar array is connected through switch 122 to a filter 116 comprising inductance 134 and diode 132. The output of the filter 116 is connected to the parallel combination of internal battery 118 and capacitor 119 and also to the second filter 114 via switch 124. Flter 114 comprise diode 126, inductance 128 and capacitor 130. The output filter 114 is connected to the load $R_L$. It is noted, that in FIGURE 15 only two switches, 122 and 124, are utilized as opposed to the three switches used in FIGURE 4. The second preferred embodiment is simpler than the first preferred embodiment in that it eliminates one of the controls by recognizing that a battery which is in parallel with a power source and a load will be charged by the power source when the voltage from the power source is above the charging voltage of the battery, and will discharge into the load when the voltage from the power source is below the charging voltage of the battery. In other words, referring to FIGURE 15, assuming that both switches 122 and 124 are closed, if the voltage from solar array 110 which passes through filter 116 is greater than the charging voltage of battery 118, the solar array will supply current to the load and also to charge battery 118. However, if the voltage from solar array 110 which passes through filter 116 is less than the voltage of internal battery 118, current to the load will be supplied from both the solar array and the battery thus causing a battery discharge. The internal battery 118 therefore receives a portion of the power which is available from the solar array when less than maximum available power from the solar array is needed to maintain resistance $R_L$ at the proper load voltage, and adds power to the load when the maximum available power from the solar array is not enough to maintain the load at its desired voltage.

In operation, switch 124 is controlled by a means not shown in FIGURE 15 which detects the actual load voltage $V_o$ and compares it with a desired load voltage $V_{L(ref)}$. The latter means acts to control the ratio of "on-time" to "off-time" of switch 124 to provide the proper amount of current appearing at point 125 to the load $R_L$ so that the desired voltage will be maintained. In order to utilize maximum available power from solar array 110, the ratio of the "on-time" to "off-time" of switch 122 is controlled by an additional means, not shown in FIGURE 15 which senses whether or not the solar array is putting out maximum available power. This can be done by a means similar to that described in conjunction with the first preferred embodiment. For example, the actual solar array voltage output, $V_a$, may be compared to a reference voltage $V_{ref}$, the latter being generated by open circuited reference solar arrays, and the results of the comparison utilized to control switch 122.

In FIGURE 16 which is the block diagram of the second preferred embodiment, it can be seen that the output from the solar array 156 is supplied to load 162 via switch 158, filter 170, switch 166, and filter 160. Also, a parallel capacitor 164 is connected to the solar array for purposes explained previously to eliminate the pulses loading of the array. A battery 172 having a parallel capacitance $C'_{18}$ is also connected to the input of switch 166 and is operable to be charged by the current from solar array 156 during that period of time when the maximum available power from the solar array is more than sufficient to provide the desired voltage at the load, and is operable to supply current to the load during that period of time when the maximum available power from solar array 156 is insufficient to provide the desired voltage at the load 162. Switch 166 is controlled by a compare circuit 152 having a first input from saw-tooth oscillator 150 and a second input from compare circuit 154. The inputs to compare circuit 154 are the actual load voltage $V_o$ and the desired load voltage $V_{L(ref)}$. Switch 158 is controlled by a compare circuit 174 which has a first input from saw-tooth oscillator 150 and a second input from compare circuit 176. The two inputs to compare circuit 176 are, respectively, the open circuit solar array reference voltage, $V_{ref}$, and the actual solar array output voltage, $V_a$. It should be noted that although compare circuits 174 and 152 are shown in FIGURE 16 as ordinary compare circuits which compare two inputs, they are shown in detail in FIGURE 17 as a Schmitt trigger which provides output signals only when the input signal is above a selected minimum. The D.C. input signal to the compare circuit raises or lowers the level of the saw-tooth voltage from the oscillator thereby causing the Schmitt trigger compare circuit to provide outputs for different durations of the saw-tooth period and ending at different times during the saw-tooth period in dependence upon the D.C. input signal. Therefore, the Schmitt trigger is arranged to act as an ordinary compare circuit.

FIGURE 17 represents a schematic diagram of the second preferred embodiment of the invention, and it will be apparent to those skilled in the art that there are many similarities between the circuit shown in FIGURE 17 and the circuits in FIGURES 6 through 14. The differences between the two embodiments as shown in schematic form will be explained below. A saw-tooth oscillator stage, consisting of transistor $Q'_2$, unijunction $Q'_1$ and associated components in FIGURE 17 similar to that described in the first embodiment, is used. The logic power supply system for the second preferred embodiment is completely different than the logic power supply system shown in FIGURE 14. In FIGURE 17, the battery 118 is used as the only source of power and its voltage is reduced to approximately 20 volts for the logic system by means of the series regulating transistor $Q'_{31}$. The voltage drop across transistor $Q'_{31}$ is varied as is necessary to maintain a constant logic system voltage, by changing its base current which is essentially the collector current of transistor $Q'_7$, the latter in combination with $Q'_8$ forming a differential amplifier used for comparing the logic system voltage, as stepped down by the voltage dividing network of $R'_{18}$ and $R'_{20}$ to that of the reference Zener diode $Z'_1$. Capacitor $C'_6$ enhances the stability and response of the supply to load changes. Resistors $R'_{24}$ and $R'_{25}$ provide the necessary base current for assuring operation of transistor $Q'_7$ and for the Zener diode, with $R'_{24}$ being necessary for initial start-up. Capacitor $C'_5$ serves as a filter for transient load changes.

A high gain differential amplifier, consisting of transistors $Q'_5$ and $Q'_6$ (corresponds to comparator 154 in FIGURE 16) and associated components, senses the output load voltage, as measured at the adjustable tap of $R'_{32}$ of the voltage dividing network consisting of $R'_{31}$, $R'_{32}$ and $R'_{33}$, for comparison to the fixed voltage reference of Zener diode $Z'_2$. Any increase or decrease in the output voltage results in a corresponding change, but with high gain, in the collector current of $Q'_6$ which, as will be explained hereafter, makes the necessary change to other circuits to correct the output voltage to the desired value as set by $R'_{32}$ adjustments.

Transistors $Q'_3$ and $Q'_4$ (which correspond to compare circuit 152 in FIGURE 16), and their associated components, form a Schmitt trigger circuit such that when the voltage, with respect to the negative side of the logic supply source, at the base of $Q'_3$ is below a particular value, $Q'_3$ will conduct, and when above a somewhat higher value, $Q'_4$ will conduct causing $Q'_{13}$ to turn and draw a relatively constant base current out of transistor $Q'_{27}$. Transistors $Q'_{27}$ and $Q'_{28}$ (corresponding to switch 166 in FIGURE 16) form the Darlington pair which switches battery voltage on through the choke $L_1$ as discussed above in connection with the load switching stage of the first preferred embodiment. Current is thus supplied to the load through the Darlington pair of transistors.

During the original start-up, the valley voltage, $V_v$, of the saw-tooth potential appearing at the base of transistor $Q'_3$ is higher than that required to turn on $Q'_3$, so thus $Q'_4$ and ultimately $Q'_{27}$ and $Q'_{28}$ conduct continuously. As the load voltage approaches the desired regulating value, $Q'_6$ begins to conduct, and in so doing creates an added voltage drop through resistors $R'_6$ and $R'_8$ such that the saw-tooth voltage at the base of $Q'_3$ is displaced so that its peak and valley voltages are lower by the amount of the added drop. When the displacement is sufficient, $Q'_3$ conducts for a portion prior to the end of each cycle, thereby turning off $Q'_{27}$ and $Q'_{28}$, and a steady state "on-time" is reached when the desired output voltage is reached. Should the battery voltage rise, the system will seek a new "on-time" to again maintain essentially the same load voltage within very close tolerances. At the start of each cycle the saw-tooth voltage peaks thereby resetting the Schmitt trigger and causing $Q'_4$ to once again conduct.

The differential amplifier circuit consisting of transistors $Q'_9$ and $Q'_{10}$ is adjusted such that $Q'_{10}$ normally is in full conduction since the voltage at the base of $Q'_{10}$, as established by the voltage divider $R'_{28}$, $R'_{29}$, $R'_{30}$ and $R'_2$ across the logic system supply, is higter than that of the base voltage of $Q'_9$ as set by $Z'_1$. Therefore, there is no current being drawn by $Q'_9$, which would otherwise cause a similar displacement in the saw-tooth voltages, until such time as an overcurrent exists at the load which would cause $Q'_{12}$ to conduct and lower the voltage at the junction of $R'_{28}$ and $R'_{29}$ and thus lower the voltage at the base of $Q'_{10}$ below that on the base of $Q'_9$, permitting the latter to conduct.

For very short "on-times" of $Q'_4$, in which case the displaced saw-tooth voltage at the time $Q'_3$ turns on is such as to place the voltage on the base of $Q'_3$ only slightly lower than the displaced peak voltage, the result is a condition whereby $Q'_3$ may not turn off at the end of the cycle due to the differential on hysteresis characteristics of a Schmitt trigger. During normal voltage regulation operation, this does not occur as a relatively long "on-time" of $Q'_4$ is required since the desired output voltage is possibly only 25% below that of the battery (implying a 75% on-time). However, during shorts at the load, this on-time may desirably be reduced to only 5% or less. For this reason, the end of cycle discharge voltage appearing across $R'_2$ within the oscillator stage is injected and causes the voltage at the base of $Q'_{10}$ to momentarily rise above that at $Q'_9$ permitting the entire saw-tooth at the base of $Q'_3$ to rise above that necessary to reset it to its off condition.

Referring now to the load overcurrent protection means, the circuit shown for this purpose in FIGURE 17 is slightly different than the circuit in FIGURE 13, but its end result is essentially the same. When the voltage drop across $R'_{S1}$ due to excessive load current reaches a value such that the voltage, as set by the current adjustment potentiometer $R'_{41}$, overcomes the inherent base-to-emitter drop of $Q'_{11}$, the latter transistor begins to conduct and in so doing ultimately turns on $Q'_{12}$ when its internal drop and that of the emitter diode $D'_8$ are less than the drop across $R'_9$ as caused by the $Q'_{11}$ collector current. The resultant amplified current then reduces the voltage at the junction of $R'_{28}$ and $R'_{29}$ to cause a reduction in output voltage to limit the current to the load as previously explained. Resistor $R'_{38}$ provides a positive feedback which makes for a more rapid fall in output voltage with increasing overload current. Capacitors $C'_7$ and $C'_8$ provide filtering essential to stability and smooth operation.

The manner in which the circuit of FIGURE 17 achieves the desired result of obtaining maximum power from the array, will now be explained. Transistors $Q'_{15}$ and $Q'_{16}$ (corresponding to comparator 174 in FIGURE 16), with associated components form a second Schmitt trigger stage, similar to that of $Q'_3$ and $Q'_4$ respectively, for driving $Q'_{17}$ and a second Darlington pair $Q'_{29}$ and $Q'_{30}$ (corresponds to switch 158 in FIGURE 16), with their associated circuitry for connecting array power to the battery bus.

Transistors $Q'_{18}$, $Q'_{19}$ and $Q'_{20}$ (corresponding to comparator 176 of FIGURE 16) perform the function of comparing actual array voltage to the array maximum power ference in a manner identical to that described with reference to FIGURE 8 of transistors $Q_{14}$, $Q_{15}$ and $Q_{16}$ therein except for the fact that the circuit of FIGURE 8 also performs other functions as well. Resistor $R'_{61}$ provides positive feedback to improve the gain of this stage. When the array voltage is higher than the reference, transistor $Q'_{19}$ ceases to conduct thereby not displacing or lowering the oscillator saw-tooth voltage as applied to the Schmitt trigger and turning on $Q'_{16}$, $Q'_{17}$ and $Q'_{29}$ and $Q'_{30}$ for the maximum on-time. Transistor $Q'_{14}$ and associated components serve as a buffer stage, in an emitter follower configuration, to the basic oscillator perviously described. Thus, the voltage applied to the base of $Q'_{15}$ is that at the lower end of $R'_{45}$ when neither $Q'_{19}$ nor $Q'_{23}$ are conducting and has a saw-tooth shape similar to that at the bottom of $R'_6$ but of a magnitude dictated by the pertinent resistances.

When $Q'_{29}$ and $Q'_{30}$ are on for their maximum period, the greatest voltage from the array is applied to the battery, and therefore the resulting charging current and current to the load are high, thus lowering the array voltage. If that total current is in excess of that which the array can deliver at the maximum power voltage, the voltage at the base of $Q'_{18}$ is lower than that at $Q'_{19}$ with the result that $Q'_{19}$ conducts and draws current through resistors $R'_{45}$ and $R'_{47}$ which displaces and lowers the saw-tooth voltage created by $Q'_{14}$ such that $Q'_{16}$ ceases to conduct thereby turning off $Q'_{17}$, $Q'_{29}$ and $Q'_{30}$. A stable operating point is reached where the array and the reference voltage are approximately equal which then provides a particular ratio of on-time to total period for the Darlington pair, thereby providing maximum power loading. Note that, unlike the first preferred embodiment, both load switch ($Q'_{27}$ and $Q'_{28}$ corresponding to switch 166 of FIGURE 16) and the array power switch ($Q'_{29}$ and $Q'_{30}$ corresponding to switch 158 of FIGURE 16) are turned on at the beginning of each cycle. This is not essential but minimizes the filter problems such that the capacitor $C'_{18}$ absorbs the majority of the transient current increase to the battery when the load switching stage opens first. The values of $R'_{62}$ and $R'_{63}$ are to be selected to give the proper ratio of open circuit potential to maximum power potential for the particular array and the reference source used.

The differential amplifier consisting of transistors $Q'_{22}$ and $Q'_{23}$ and associated components compares the actual battery voltage to a reference, created by the logic system voltage divider network of resistors $R'_{64}$, $R'_{65}$, and $R'_{66}$ for the purpose of limiting the maximum battery voltage during charging. Adjustable resistor $R'_{75}$ can be set for any desired limit over its range of control. Capacitor $C'_{17}$ smooths out any battery voltage ripple during the charging cycle. When the upper battery voltage limit as set by $R'_{75}$ is reached, $Q'_{23}$ begins to conduct and reduces the on-time of $Q'_{29}$ and $Q'_{30}$ thus reducing the voltage applied to the battery similar to that caused by $Q'_{19}$. Similarly, when the battery charging current is higher than desired as an upper limit and as set by $R'_{71}$, transistors $Q'_{21}$ and $Q'_{26}$ conduct (similar to that for $Q'_{11}$ and $Q'_{12}$ in the load current stage) increasing the drop across $R'_{64}$ thus reducing the reference voltage at the base of $Q'_{22}$ and giving the appearance of an overvoltage at the battery with appropriate corrective action as previously described when the upper voltage limit is reached. Positive feedback, such as given by $R'_{38}$, is not employed in this particular circuit arrangement.

Capacitor $C'_{19}$ provides the array filtering action which is provided by capacitor $C_{12}$ in FIGURE 4. Diode $D'_{17}$ prevents any reverse current due to leakage in $Q'_{29}$ and $Q'_{30}$ from the battery during nighttime operation.

The circuits shown in FIGURE 17 are included only by way of example and it is not intended that the invention or even the second preferred embodiment be limited to these identical circuits. The figure shows only one type of circuitry which is capable of performing the functions described in conjunction with the block diagram shown in FIGURE 16, and it will be understood by those skilled in the art that various other circuits may be used which perform the identical functions. However, if the circuits shown in FIGURE 17 are used in practicing the invention, the following parameters may be advantageously used:

Resistors—All ¼ watt except as noted:
    $R'_1$—330
    $R'_{2,37,69}$—27
    $R'_{3,22,25,28,64}$—10K
    $R'_{4,62}$—22K
    $R'_{5,11,18}$—18K $R'_{6,21,27,34,39,42,60,70,77}$—1K
$R'_7$—3.9K
$R'_{8,20,23,29,47,51,65,66}$—4.7K
$R'_{9,67}$—3.3K
$R'_{10,15,50}$—1.2K
$R'_{12}$—47K
$R'_{13,30,56,57,63}$—5.6K
$R'_{14,19,33,59}$—2.7K
$R'_{16}$—82
$R'_{17,54}$—1.2K—1 watt
$R'_{24,61}$—56K
$R'_{26}$—820
$R'_{31,40,49,68}$—12K
$R'_{32,71,75}$—10K potentiometer
$R'_{35,73}$—1.8K
$R'_{36}$—15K
$R'_{38}$—220K
$R'_{41}$—5K potentiometer
$R'_{43,78}$—47
$R'_{44,48,52,76}$—3.3K
$R'_{45,58,72}$—2.2K
$R'_{46}$—6.8K
$R'_{53}$—470
$R'_{55,74}$—27K
$R'_{S1,S2}$—0.025 shunts Diodes:
$D'_{1-16}$—1 N 645
$D'_{17-19}$—1 N 1202
$Z'_{1-2}$—1 N 750 A Capacitors:
$C'_{1,6,12}$—0.1 mfd.
$C'_2$—0.047 mfd.
$C'_{3,7,16,17}$—1.0 mfd.
$C'_{4,11}$—220 mmfd.
$C'_5$—82 mfd.
$C'_{8,15}$—0.82 mfd.
$C'_{9,20}$—50 mfd.
$C'_{10,18}$—6100 mfd.—50 wv.D.C.
$C'_{13,14}$—3.3 mfd.
$C'_{19}$—6100 mfd.—100 wv.D.C.

Transistors
$Q'_1$—2 N 490
$Q'_{2,18,19,20,22,23}$—2 N 335
$Q'_{3,4}$—2 N 396
$Q'_{5,6,7,8,11,14,21,24,25}$—2 N 634 A
$Q'_{9,10}$—2 N 438
$Q'_{12,26}$—2 N 587
$Q'_{13,17}$—2 N 498
$Q'_{15,16}$—2 N 404
$Q'_{27,28,29,30}$—2 N 1358
$Q'_{31}$—2 N 392

The above description in conjunction with the drawings shows that applicant has invented a power array system which operates at greater efficiency than heretofore possible, and utilizes substantially maximum power from the power array at all times. Also, applicant's invention includes the features of regulating the load voltage, providing additional power to charge an internal battery when additional power is available, and utilizing the internal battery for time-sharing the load with the power array when power is necessary.

This invention is an improved version of the power maximizing system described and claimed in applicant's earlier copending application, Ser. No. 151,532, filed Nov. 10, 1961.

While the invention has been particularly shown and described with reference to preferred embodiments thereof, it will be understood by those skilled in the art that various changes in form and details may be made therein without departing from the spirit and scope of the invention.

What is claimed is:

1. A system for efficiently utilizing power from a solar cell array of the type which produces variable power, voltage and current, and provides maximum available power when the impedance seen by the array is at an optimum value, the system comprising:
   (a) a load,
   (b) a first switch connected between said load and said array,
   (c) means responsive to the actual voltage at said load and the desired load voltage for controlling the ratio of the on-time to off-time of said switch to provide the desired load voltage at said load,
   (d) a battery,
   (e) a second switch connected between said battery and said array,
   (f) means for generating a voltage reference that is a function of the voltage at which maximum available power can be drawn from said array,
   (g) first control means responsive to said voltage reference and a voltage derived from the actual voltage across said array for controlling the ratio of on-time to off-time of said second switch when said voltage reference is less than said derived voltage,
   (h) a third switch connected between said battery and said load, and
   (i) a second control means responsive to said voltage reference and said derived voltage for controlling the ratio of on-time to off-time of said third switch when said voltage reference is greater than said derived voltage.

2. The system as claimed in claim 1 further comprising a first filter connected between said load and said first and third switches, and a second filter connected between said battery and said second switch.

3. The system as claimed in claim 1 further comprising second voltage regulating means responsive to said load voltage and a nighttime reference voltage for maintaining the load voltage at the desired levels when the power output from the array is substantially zero and the battery is capable of supplying the desired load voltage to the load.

4. The system as claimed in claim 2 further comprising second voltage regulating means responsive to said load voltage and a nighttime reference voltage for maintaining the load voltage at the desired levels when the power output from the array is substantially zero and the battery is capable of supplying the desired load voltage to the load.

5. A power supply system of the type having a load, a battery, and a solar array, said solar array producing variable power, voltage and current, whereby maximum available power from said solar array is produced only when said array is operating at a voltage $V_{mp}$, the improvement comprising:
   (a) a first switching means connected between said array and said load,
   (b) a first comparator responsive to the load voltage and a desired reference load voltage for producing a first error signal dependent upon the difference between said load voltage and said desired load voltage,
   (c) a sawtooth oscillator,
   (d) a second comparator responsive to said first error voltage and the sawtooth voltage from said oscillator for closing said first switch when said error voltage is greater than said sawtooth voltage,
   (e) a second switching means connected between said solar array and said battery,
   (f) means for generating a voltage reference equal to $V_{mp}$,
   (g) a first control means responsive to said sawtooth voltage, said voltage reference and the actual array voltage for closing said second switch during a portion of said sawtooth cycle depending upon the difference between said reference voltage and said actual array voltage when said actual array voltage is greater than said voltage reference, (h) a third switching means connected between said battery and said load, and (i) a second control means responsive to said reference voltage, said actual array voltage and said sawtooth voltage for closing said third switch during a portion of said sawtooth cycle depending upon the difference between said reference voltage and said actual array voltage when said actual array voltage is less than said voltage reference.

6. The system as claimed in claim 5 further comprising means responsive to the absence of power at said array for closing said third switching means.

7. The system as claimed in claim 5 further comprising means responsive to the absence of power at said array for closing said third switching means for a portion of said sawtooth cycle dependent upon the desired load voltage.

8. The system as claimed in claim 5 further comprising a capacitor placed in parallel with said array.

9. The system as claimed in claim 5 further comprising a first filter connected between said load and said first and third switching means and a second filter connected between said battery and said second switching means.

10. The system claimed in claim 5 further comprising means operative when said second switch is closed for limiting the current supplied to said battery by said solar array.

11. The system as claimed in claim 5 further comprising
(a) a first filter connected between said load and said first and third switching means,
(b) a second filter connected between said battery and said second switching means,
(c) a capacitor connected in parallel with said solar array,
(d) means responsive to the absence of power at said array for closing said third switching means for a portion of said sawtooth cycle dependent upon the desired load voltage, and
(e) means operative when said second switch is closed for limiting the current supplied to said battery by said solar array.

12. The system as claimed in claim 5 further comprising:
(a) a first filter connected between said load and said first and second means,
(b) a second filter connected between said battery and said second switching means,
(c) a capacitor connected in parallel with said solar array,
(d) means responsive to the absence of power at said array for closing said third switching means for a portion of said sawtooth cycle dependent upon the desired load voltage, and
(e) means operative when said second switch is closed for limiting the potential applied across the battery by said solar array.

13. In a system of the type including a source of power an internal battery and a load, the combination comprising:
(a) means including first and second switches for connecting said power supply to said load,
(b) said battery being connected to said load and said power supply through said second and first switches respectively,
(c) means for controlling the ratio of on-time to off-time of said second switch in accordance with the difference between the actual load voltage and the desired load voltage, and
(d) means capable of sensing deviations from maximum available power generated by said power supply for controlling the ratio of on-time to off-time of said first switch.

14. The combination as claimed in claim 13 wherein the means for connecting the power supply to the load further comprises a first filter connected between said first and second switches and a second filter connected between said second switch and said load.

15. In a power supply system of the type having a solar array, an internal battery, and a load, the combination comprising:
(a) first and second switches connected in series between said solar array and said load,
(b) means connecting said internal battery in parallel with said solar array and said load whereby said first switch separates said battery from said solar array and said second switch separates said battery from said load, and
(c) means operating the said first and second switches for causing the voltage across said load to be at a desired value and said solar array to be delivering maximum available power.

16. The combination as claimed in claim 15 wherein said last named means comprises:
(a) a first circuit means for comparing the desired load voltage to the actual load voltage and for providing an output dependent upon the difference between the two,
(b) a second circuit means responsive to the output of said first circuit means, for controlling the ratio of on-time to off-time of said second switch, and
(c) third means for sensing the deviation of the solar array output from maximum available power and for controlling the ratio of on-time to off-time of said first switch.

17. The combination of claim 16 wherein said third means comprises:
(a) a first comparator having two inputs and an output, one of said inputs being connected to said array output and the other being connected to a point of reference voltage, and
(b) a second comparator circuit responsive to the output from said first comparator and to a periodic timing means for controlling the on-time of said first switch during each period of said periodic timing means.

18. A circuit for sensing whether or not a solar array under varying conditions of light intensity and cell temperature is producing its maximum available power comprising:
(a) a difference circuit having two inputs and an output,
(b) a reference solar array placed in sufficient proximity to said solar array to be exposed to the same environmental conditions,
(c) means for connecting a given percentage of said reference solar array open circuit voltage to the first input of said difference circuit, and
(d) means for connecting the solar array output voltage to the second output of said difference circuit, the voltage input of said difference circuit being an indication of whether the solar array is delivering maximum available power.

19. A circuit for use with a power supply having a variable amount of available power, a battery and a load for obtaining maximum utilization of the power available from the power supply, comprising:
(a) indicating means for providing an indication whenever the power supply is not supplying the maximum power it has available;
(b) switch means connecting the battery to the supply and to the load; and
(c) control means responsive to said indicating means for controlling the duty cycle of said switch means to effect maximum utilization of the power available from the supply.

References Cited

UNITED STATES PATENTS

| | | | |
|---|---|---|---|
| 3,106,665 | 10/1963 | Byles. | |
| 3,222,535 | 12/1965 | Englehardt | 250—212 X |
| 3,308,306 | 3/1967 | Bagno | 320—5 X |
| 3,317,809 | 5/1967 | Bowers et al. | 307—66 X |
| 3,344,282 | 9/1967 | Baude | 307—66 |
| 3,350,618 | 10/1967 | Barney et al. | 320—5 |

ROBERT K. SCHAEFER, Primary Examiner

H. J. HOHAUSER, Assistant Examiner

U.S. Cl. X.R.

320—15